(12) United States Patent
Khosravi et al.

(10) Patent No.: US 9,137,659 B2
(45) Date of Patent: Sep. 15, 2015

(54) METHOD AND SYSTEM FOR DECOUPLING USER AUTHENTICATION AND DATA ENCRYPTION ON MOBILE DEVICES

(71) Applicant: FusionPipe Software Solutions Inc., Vancouver (CA)

(72) Inventors: Hassan Khosravi, Vancouver (CA); Ildar Muslukhov, Vancouver (CA); Peter Luong, Vancouver (CA)

(73) Assignee: FusionPipe Software Solutions Inc., Vancouver, BC (CA)

( * ) Notice: Subject to any disclaimer, the term of this patent is extended or adjusted under 35 U.S.C. 154(b) by 0 days.

(21) Appl. No.: 13/943,070

(22) Filed: Jul. 16, 2013

(65) Prior Publication Data
US 2014/0321641 A1 Oct. 30, 2014

Related U.S. Application Data

(63) Continuation of application No. PCT/CA2013/050528, filed on Jul. 8, 2013.

(60) Provisional application No. 61/816,123, filed on Apr. 25, 2013.

(30) Foreign Application Priority Data

Jul. 8, 2013 (WO) ................ PCT/CA2013/050528

(51) Int. Cl.
*H04L 9/00* (2006.01)
*H04W 12/04* (2009.01)
(Continued)

(52) U.S. Cl.
CPC .............. *H04W 12/04* (2013.01); *H04L 9/0822* (2013.01); *H04L 9/0844* (2013.01); *H04L 9/0894* (2013.01); *H04L 63/061* (2013.01); *H04L 2209/80* (2013.01); *H04L 2463/062* (2013.01)

(58) Field of Classification Search
None
See application file for complete search history.

(56) References Cited

U.S. PATENT DOCUMENTS 4,405,829 A 9/1983 Rivest et al.
5,850,444 A * 12/1998 Rune .............................. 705/79
(Continued)

FOREIGN PATENT DOCUMENTS

EP 1 880 569 1/2008
EP 2 363 977 A1 9/2011
(Continued)

OTHER PUBLICATIONS

International Search Report and Written Opinion for corresponding International Patent Application No. PCT/CA2013/050528 (Jan. 24, 2014).

*Primary Examiner* — Brandon Hoffman
(74) *Attorney, Agent, or Firm* — LeClairRyan, a Professional Corporation

(57) ABSTRACT

A method for decoupling user authentication and data encryption on mobile devices includes generating an encryption key ("EK") for encrypting data and a key encryption key ("KEK") for encrypting the EK, obtaining an encrypted EK by encrypting the EK using the KEK, storing the encrypted EK on a data container device ("DCD"), and storing the KEK on a key vault device ("KVD") that is distinct from the DCD. Neither the EK nor KEK are generated using a user authentication secret as a seed. The DCD may fetch the KEK from the KVD as desired to decrypt the EK and to encrypt and decrypt data stored on the DCD. Examples of the DCD include a memory stick, smartphone, or tablet computer, while examples of the KVD include a dongle, smartphone, or tablet computer.

79 Claims, 17 Drawing Sheets

(51) Int. Cl.
*H04L 9/08* (2006.01)
*H04L 29/06* (2006.01)

(56) References Cited

U.S. PATENT DOCUMENTS

| | | |
|---|---|---|
| 7,463,861 B2 | 12/2008 | Eisenbach |
| 8,112,638 B2 | 2/2012 | Almgren |
| 8,190,129 B2 | 5/2012 | Ayed |
| 2009/0150970 A1 | 6/2009 | Hinds et al. |
| 2013/0102251 A1 | 4/2013 | Linde et al. |

FOREIGN PATENT DOCUMENTS

| | | |
|---|---|---|
| EP | 2 523 417 A1 | 11/2012 |
| JP | 2003264548 A | 9/2003 |
| JP | 2010199979 A | 9/2010 |
| WO | 02/056536 A1 | 7/2002 |
| WO | 2006/121393 A1 | 11/2006 |
| WO | 2011/056700 A2 | 5/2011 |

\* cited by examiner

METHOD AND SYSTEM FOR DECOUPLING USER AUTHENTICATION AND DATA ENCRYPTION ON MOBILE DEVICES

CROSS REFERENCE TO RELATED APPLICATIONS

This application is a continuation of International Application No. PCT/CA2013/050528, filed Jul. 8, 2013, which claims the benefit of Provisional Application No. 61/816,123, filed Apr. 25, 2013, the entireties of both of which are hereby incorporated by reference.

TECHNICAL FIELD

The present disclosure is directed at methods, systems, and techniques for decoupling user authentication and data encryption on mobile devices.

BACKGROUND

Smartphones and tablets are among the most ubiquitous personal computing devices in use today. Smartphones and tablets are designed to be more mobile than laptop or desktop computers; this results in their being easier to steal and more likely to be lost. One issue that arises when a mobile device such as a smartphone or tablet is lost or stolen is whether the data contained on that mobile device is secure; i.e., whether unauthorized access to the data is being prevented.

A thief who steals a mobile device has the opportunity to run off-line, brute force attacks in an attempt to discover the authentication secrets (e.g.: PIN-codes) and encryption keys that the rightful owner of the device uses to protect the data. A mobile device's owner may not even realize that his or her device has been attacked in this way; for example, an untrustworthy coworker or family member may perform a "lunchtime-attack" by borrowing the mobile device and attacking it while borrowed.

Defending against unauthorized access of data is being complicated by companies more widely adopting Bring-Your-Own-Device ("BYOD") policies. In particular, BYOD policies increase the complexity of device management for information technology ("IT") departments due to the higher variety of devices that employees typically use once a company adopts a BYOD policy.

Given the foregoing, there exists a continued need to protect and secure data, and in particular data stored on mobile devices.

SUMMARY

According to a first aspect, there is provided a method for decoupling user authentication and data encryption on mobile devices, the method comprising generating an encryption key ("EK") for encrypting data and a key encryption key ("KEK") for encrypting the EK, wherein neither the EK nor the KEK are generated using a user authentication secret as a seed; obtaining an encrypted EK by encrypting the EK using the KEK; storing the encrypted EK on a data container device ("DCD"); and storing the KEK on a key vault device ("KVD") that is distinct from the DCD.

The method may further comprise generating a KEK identifier ("KEK_ID") that identifies the KEK; and storing the KEK_ID in memory accessible to an application resident on the DCD that accesses the data and on the KVD.

The DCD may generate the KEK, the EK, and the KEK_ID, and the method may further comprise deleting the KEK from the DCD following encrypting the EK.

The application may encrypt or decrypt the data by obtaining the EK; encrypting or decrypting the data using the EK; and deleting the EK following encryption or decryption.

Obtaining the EK may comprise sending a request from the application for the EK, wherein the request comprises the KEK_ID; retrieving, from the KVD, the KEK that the KEK_ID identifies; decrypting, on the DCD, the EK encrypted using the KEK retrieved from the KVD; and sending the EK decrypted using the KEK to the application.

Obtaining the EK may comprise sending a request from the application for the EK, wherein the request comprises the KEK_ID; determining whether the EK is cached on the DCD; and when the EK is cached on the DCD, sending the EK that is cached on the DCD to the application.

The method may further comprise safeguarding the data by deleting one or both of the EK and KEK.

The DCD may comprise a memory stick.

The EK and KEK may expire, and the method may further comprise replacing the EK and KEK that expire with a different EK and a different KEK, respectively.

The KVD and DCD may be wirelessly linked.

The Bluetooth™ Low Energy protocol may be used to link the KVD and DCD.

The method may further comprise determining whether the KVD and DCD cease to be wirelessly linked; and deleting the EK from the DCD when the KVD and DCD cease to be wirelessly linked.

The method may further comprise wirelessly pairing the KVD and DCD by generating a weak shared secret key ("WS2K") on the KVD and DCD; mutually authenticating the KVD and DCD to each other using the WS2K; following mutual authentication, generating a strong secure session key ("S3K") on the KVD and DCD; and encrypting subsequent communications between the KVD and DCD using the S3K.

The S3K may expire and the method may further comprise replacing the S3K that expires with a different S3K.

An Out of Bounds or Passkey Entry Bluetooth™ Low Energy association model may be used to generate the WS2K.

A key vault system manager ("KVSM") may be wirelessly communicative with at least one of the KVD and DCD, and the method may further comprise sending device health information from each of the at least one of the KVD and DCD to the KVSM; determining a health status of each of the at least one of the KVD and DCD based on the device health information; deleting the EK and KEK based on the health status.

The at least one of the KVD and DCD may determine its own health status.

The KVSM may determine the health status of each of the at least one of the KVD and DCD and it may push the health status to each of the at least one of the KVD and DCD.

The method may further comprise backing up the EK, KEK, and KEK_ID by pushing them from the DCD and KVD to the KVSM.

The EK may be encrypted using a public key having a linked private key, and the method may further comprise recovering encrypted data following loss of one or both of the encrypted EK and KEK by decrypting, using the private key, the EK encrypted using the public key; generating a new KEK, wherein the new KEK is not generated based on the user authentication secret; generating a new encrypted EK by encrypting the EK using the new KEK; storing the new encrypted EK on the DCD; and storing the new encrypted KEK on the KVD.

The EK and KEK may be generated pseudorandomly.

According to another aspect, there is provided a method for decoupling user authentication and data encryption on mobile devices, the method comprising decrypting an encrypted encryption key ("EK") stored on a data container device ("DCD") by i) wirelessly retrieving to the DCD from a key vault device ("KVD") a key encryption key ("KEK") used to encrypt the EK; and ii) decrypting the encrypted EK using the KEK; and encrypting or decrypting data stored on the DCD using the EK, wherein neither the EK nor the KEK are generated using a user authentication secret as a seed.

The method may further comprise deleting the EK from the DCD following encrypting or decrypting data.

The method may further comprise, prior to decrypting the encrypted EK, generating the EK and the KEK; obtaining the encrypted EK by encrypting the EK using the KEK; storing the encrypted EK on the DCD; and storing the KEK on the KVD.

The method may further comprise generating a KEK identifier ("KEK_ID") that identifies the KEK; and storing the KEK_ID in memory accessible to an application resident on the DCD that accesses the data and on the KVD.

The DCD may generate the KEK, the EK, and the KEK_ID, and the method may further comprise deleting the KEK from the DCD following encrypting EK.

Wirelessly retrieving the KEK from the KVD may comprise sending a request for the KEK_ID from the DCD to the KVD, wherein the request comprises the KEK_ID; and sending the KEK that the KEK_ID identifies from the KVD to the DCD.

The method may further comprise safeguarding the data by deleting one or both of the EK and KEK.

The DCD may comprise a memory stick.

The EK and KEK may expire and the method may further comprise replacing the EK and KEK that expire with a different EK and a different KEK, respectively.

The Bluetooth™ Low Energy protocol may be used to link the KVD and DCD.

The method may further comprise determining whether the KVD and DCD cease to be wirelessly linked; and deleting the EK from the DCD when the KVD and DCD cease to be wirelessly linked.

The method may further comprise wirelessly pairing the KVD and DCD by generating a weak shared secret key ("WS2K") on the KVD and DCD; mutually authenticating the KVD and DCD to each other using the WS2K; following mutual authentication, generating a strong secure session key ("S3K") on the KVD and DCD; and encrypting subsequent communications between the KVD and DCD using the S3K.

The S3K may expire and the method may further comprise replacing the S3K that expires with a different S3K.

An Out of Bounds or Passkey Entry Bluetooth™ Low Energy association model may be used to generate the WS2K.

A key vault system manager ("KVSM") may be wirelessly communicative with at least one of the KVD and DCD, and the method may further comprise sending device health information from each of the at least one of the KVD and DCD to the KVSM; determining a health status of each of the at least one of the KVD and DCD based on the device health information; and deleting the EK and KEK based on the health status.

At least one of the KVD and DCD may determine its own health status.

The KVSM may determine the health status of each of the at least one of the KVD and DCD and push the health status to each of the at least one of the KVD and DCD.

The method may further comprise backing up the EK, KEK, and KEK_ID by pushing them from the DCD and KVD to the KVSM.

The EK may be encrypted using a public key having a linked private key, and the method may further comprise recovering encrypted data following loss of one or both of the encrypted EK and KEK by decrypting, using the private key, the EK encrypted using the public key; generating a new KEK, wherein the new KEK is not generated based on the user authentication secret; generating a new encrypted EK by encrypting the EK using the new KEK; storing the new encrypted EK on the DCD; and storing the new encrypted KEK on the KVD.

The EK and KEK may be generated pseudorandomly.

According to another aspect, there is provided a system for decoupling user authentication and data encryption on mobile devices, the system comprising a data container device ("DCD") wirelessly linked to a key vault device ("KVD"), the DCD comprising a DCD memory and a DCD controller communicative with the DCD memory, the DCD memory having encoded thereon statements and instructions cause the DCD controller to generate an encryption key ("EK") for encrypting data and a key encryption key ("KEK") for encrypting the EK, wherein neither the EK nor the KEK are generated using a user authentication secret as a seed; obtain an encrypted EK by encrypting the EK using KEK; store the encrypted EK in the DCD memory; and send the KEK to the KVD; the KVD comprising a KVD memory and a KVD controller communicative with the KVD memory, the KVD memory having encoded thereon statements and instructions to cause the KVD controller to receive the KEK from the DCD; and store the KEK in the KVD memory.

The DCD memory may be further encoded to cause the DCD controller to generate a KEK identifier ("KEK_ID") that identifies the KEK; and store the KEK_ID in the DCD memory, wherein the DCD memory is accessible to an application resident on the DCD that accesses the data.

The DCD memory may be further encoded to cause the DCD controller to generate the KEK, the EK, and the KEK_ID, and to delete the KEK from the DCD following encrypting the EK.

The DCD memory may be further encoded to cause the application to encrypt or decrypt the data by obtaining the EK; encrypting or decrypting the data using the EK; and deleting the EK following encryption or decryption.

Obtaining the EK may comprise sending a request from the application for the EK, wherein the request comprises the KEK_ID; retrieving, from the KVD, the KEK that the KEK_ID identifies; decrypting, on the DCD, the EK encrypted using the KEK retrieved from the KVD; and sending the EK decrypted using the KEK to the application.

Obtaining the EK may comprise sending a request from the application for the EK, wherein the request comprises the KEK_ID; determining whether the EK is cached on the DCD; and when the EK is cached on the DCD, sending the EK that is cached on the DCD to the application.

The DCD memory may be further encoded to cause the DCD controller to safeguard the data by deleting one or both of the EK and KEK.

The DCD may comprise a memory stick.

The DCD memory may be further encoded to cause the EK and KEK to expire and to cause the DCD controller to replace the EK and KEK that expire with a different EK and a different KEK, respectively.

The Bluetooth™ Low Energy protocol may be used to link the KVD and DCD.

The DCD memory may be further configured to cause the DCD controller to determine whether the KVD and DCD cease to be wirelessly linked; and delete the EK from the DCD when the KVD and DCD cease to be wirelessly linked.

The DCD memory and KVD memory may be further encoded to cause the DCD and KVD, respectively, to wirelessly pair with each other by generating a weak shared secret key ("WS2K") on the KVD and DCD; mutually authenticating the KVD and DCD to each other using the WS2K; following mutual authentication, generating a strong secure session key ("S3K") on the KVD and DCD; and encrypting subsequent communications between the KVD and DCD using the S3K.

The S3K may expire and the DCD memory and the KVD memory may be further encoded to cause the DCD and KVD, respectively, to replace the S3K that expires with a different S3K.

An Out of Bounds or Passkey Entry Bluetooth™ Low Energy association model may be used to generate the WS2K.

The system may further comprise a key vault system manager ("KVSM") wirelessly communicative with the KVD and DCD, the KVSM comprising a KVSM memory communicative with a KVSM controller, the KVSM memory having encoded thereon statements and instructions to cause the KVSM controller to receive device health information from the KVD and DCD, wherein the DCD memory and the KVD memory are further encoded to cause the DCD controller and the KVD controller, respectively, to send device health information to the KVSM.

The DCD memory and the KVD memory may be further encoded to cause the DCD controller and the KVD controller, respectively, to determine the health status of the DCD and the KVD, respectively, from the device health information; and delete the EK and KEK based on the health status.

The KVSM memory may be further encoded to cause the KVSM controller to determine health statuses of the KVD and DCD from the device health information; and push the health statuses to the KVD and DCD, wherein the DCD memory and the KVD memory are further encoded to cause the DCD controller and the KVD controller, respectively, to delete the EK and KEK based on one or more of the health status.

The DCD memory and the KVD memory may be further encoded to back up the EK, KEK, and KEK_ID by pushing them to the KVSM.

The DCD memory may have stored thereon the EK encrypted using a public key having a linked private key, and the DCD memory may be further encoded to cause the DCD controller to decrypt, using the private key, the EK encrypted using the public key; generate a new KEK, wherein the new KEK is not generated based on the user authentication secret; generate a new encrypted EK by encrypting the EK using the new KEK; store the new encrypted EK in the DCD memory; and send the new encrypted KEK to the KVD for storage.

The EK and KEK may be generated pseudorandomly.

According to another aspect, there is provided a system for decoupling user authentication and data encryption on mobile devices, the system comprising a data container device ("DCD") wirelessly linked to a key vault device ("KVD"), the DCD comprising a DCD memory and a DCD controller communicative with the DCD memory and the KVD comprising a KVD memory and a KVD controller communicative with the KVD memory, the DCD memory having encoded thereon statements and instructions to cause the DCD controller to decrypt an encrypted encryption key ("EK") stored in the DCD memory by 1) wirelessly retrieving from the KVD a key encryption key ("KEK") used to encrypt the EK; and 2) decrypting the encrypted EK using the KEK; and encrypt or decrypt data stored in the DCD memory using the EK, wherein neither the EK nor the KEK are generated using a user authentication secret as a seed.

The DCD memory may be further encoded to cause DCD controller to delete the EK following encrypting or decrypting data.

The DCD memory may be further encoded to cause the DCD controller to generate the EK and the KEK; obtain the encrypted EK by encrypting the EK using the KEK; store the encrypted EK in the DCD memory; and send the KEK to the KVD.

The DCD memory may be further encoded to cause the DCD controller to generate a KEK identifier ("KEK_ID") that identifies the KEK; and store the KEK_ID in the DCD memory, wherein the DCD memory is accessible to an application resident on the DCD that accesses the data.

The DCD memory may be further encoded to cause the DCD controller to generate the KEK, the EK, and the KEK_ID, and to delete the KEK from the DCD following encrypting the EK.

Wirelessly retrieving the KEK from the KVD may comprise sending a request for the KEK_ID from the DCD to the KVD, wherein the request comprises the KEK_ID; and sending the KEK that the KEK_ID identifies from the KVD to the DCD The DCD memory may be further encoded to cause the DCD controller to safeguard the data by deleting one or both of the EK and KEK.

The DCD may comprise a memory stick.

The DCD memory may be further encoded to cause the EK and KEK to expire and to cause the DCD controller to replace the EK and KEK that expire with a different EK and a different KEK, respectively.

The Bluetooth™ Low Energy protocol may be used to link the KVD and DCD.

The DCD memory may be further configured to cause the DCD controller to determine whether the KVD and DCD cease to be wirelessly linked; and delete the EK from the DCD when the KVD and DCD cease to be wirelessly linked.

The DCD memory and KVD memory may be further encoded to cause the DCD and KVD, respectively, to wirelessly pair with each other by generating a weak shared secret key ("WS2K") on the KVD and DCD; mutually authenticating the KVD and DCD to each other using the WS2K; following mutual authentication, generating a strong secure session key ("S3K") on the KVD and DCD; and encrypting subsequent communications between the KVD and DCD using the S3K.

The S3K may expire and the DCD memory and the KVD memory may be further encoded to cause the DCD and KVD, respectively, to replace the S3K that expires with a different S3K.

An Out of Bounds or Passkey Entry Bluetooth™ Low Energy association model may be used to generate the WS2K.

The system may further comprise a key vault system manager ("KVSM") wirelessly communicative with the KVD and DCD, the KVSM comprising a KVSM memory communicative with a KVSM controller, the KVSM memory having encoded thereon statements and instructions to cause the KVSM controller to receive device health information from the KVD and DCD, wherein the DCD memory and the KVD memory are further encoded to cause the DCD controller and the KVD controller, respectively, to send device health information to the KVSM.

The DCD memory and the KVD memory may be further encoded to cause the DCD controller and the KVD controller, respectively, to determine the health status of the DCD and the KVD, respectively, from the device health information; and delete the EK and KEK based on the health status.

The KVSM controller may be further encoded to cause the KVSM controller to determine health statuses of the KVD and DCD from the device health information; and push the health statuses to the KVD and DCD, wherein the DCD memory and the KVD memory are further encoded to cause the DCD controller and the KVD controller, respectively, to delete the EK and KEK based on one or more of the health status.

The DCD memory and the KVD memory may be further encoded to back up the EK, KEK, and KEK_ID by pushing them to the KVSM.

The DCD memory may have stored thereon the EK encrypted using a public key having a linked private key, and the DCD memory may be further encoded to cause the DCD controller to decrypt, using the private key, the EK encrypted using the public key; generate a new KEK, wherein the new KEK is not generated based on the user authentication secret; generate a new encrypted EK by encrypting the EK using the new KEK; store the new encrypted EK in the DCD memory; and send the new encrypted KEK to the KVD for storage.

The EK and KEK may be generated pseudorandomly.

According to another aspect, there is provided a method for encrypting data, which comprises generating an encryption key (EK) and a key encryption key (KEK); encrypting data on a data container device (DCD) using the EK; encrypting the EK using the KEK and storing the encrypted EK on the DCD; storing the KEK on a key vault device (KVD); and deleting the KEK from the DCD.

The KEK may be wirelessly transmitted to the key vault device (KVD). Additionally or alternatively, the KEK and EK may be generated by the DCD.

The EK and KEK may be symmetric or asymmetric cryptographic keys. The EK and KEK may also expire from time to time.

The method may further comprise wirelessly retrieving the KEK from the KVD; decrypting the encrypted EK using the KEK; and decrypting the data using the decrypted EK.

Wireless communication may be performed using the Bluetooth™ low energy standard, or may be performed using a protocol that is based on but a modification of the Bluetooth™ low energy standard; for example, the standard may be modified to permit establishment of a shared, secret, and secure key between the DCD and KVD.

According to another aspect, there is provided a system for encrypting data, the system comprising a data container device (DCD), the DCD comprising a DCD memory communicative with a DCD controller, the DCD memory having encoded thereon statements and instructions to perform a DCD method comprising (i) generating an encryption key (EK) and a key encryption key (KEK); (ii) encrypting data on the DCD using the EK; (iii) encrypting the EK using the KEK and storing the encrypted EK on the DCD; (iv) wirelessly transmitting the KEK; and (v) deleting the KEK. The system also comprises a key vault device (KVD), the KVD comprising a KVD memory communicative with a KVD controller, the KVD memory having encoded thereon statements and instructions to perform a KVD method comprising: (i) wirelessly receiving the KEK from the DCD; and (ii) storing the KEK.

The EK and KEK may be symmetric or asymmetric cryptographic keys. The EK and KEK may also expire from time to time.

The DCD method may further comprise wirelessly retrieving the KEK from the KVD; decrypting the encrypted EK using the KEK; and decrypting the data using the decrypted EK, and the KVD method may further comprise wirelessly sending the KEK to the DCD when requested to do so by the DCD.

Wireless communication may be performed using the Bluetooth™ low energy standard, or may be performed using a protocol that is based on but a modification of the Bluetooth™ low energy standard; for example, the standard may be modified to permit establishment of a shared, secret, and secure key between the DCD and KVD.

According to another aspect, there is provided a method for decrypting data, the method comprising wirelessly retrieving a key encryption key (KEK), wherein the KEK is used to encrypt an encryption key (EK) that is used to encrypt the data; decrypting the EK with the KEK; and decrypting the data with the decrypted EK.

According to another aspect, there is provided a non-transitory computer readable medium having encoded thereon statements and instructions to cause a controller to perform any of the aspects of the method described above or any suitable combination thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Over a billion people today use smartphones, which are portable and highly mobile personal computers. Various data is stored on these devices for the benefit of being accessible "on-the-go". This creates the need to protect sensitive data that is stored on smartphones and other mobile devices such as tablets. Data encryption with a randomly generated encryption key can be applied. However, since the device has to be able to work when off-line, the encryption key has to be stored on the device along with the encrypted data. In order to overcome this limitation, major mobile platforms typically encrypt the encryption key with a so called "key encryption key". The key encryption key is derived from an authentication secret that is used to authenticate smartphone users (e.g., a user's PIN-code or password). Unfortunately, PIN-codes and passwords may be weak and accordingly prone and susceptible to bruteforce attacks.

The embodiments described herein are directed at systems, methods, and techniques for mitigating problems related to dependency of data encryption on weak authentication secrets, and in particular on mobile devices such as smartphones, tablets, and memory sticks. This dependency can render data encryption ineffective. The systems, methods, and techniques described herein remove this dependency, and thus substantially increase the amount of work a third party who wants to get unauthorized access to the data (an "adversary") has to do in order to get that access.

The decoupling of data encryption from authentication secrets is achieved by using random encryption keys (collectively, "EKs" with each being an "EK") for data encryption and random key encryption keys (collectively, "KEKs" with each being a "KEK") for EK encryption, without involving any authentication secret in the process of EK and KEK generation. In the depicted embodiments this is done by generating the EK and KEK without using the user's authentication secret as a seed; e.g., by generating the EK and KEK with a pseudorandom number generator that does not use the user's authentication secret as a seed. Furthermore, KEKs are stored on a separate device, so that if only the mobile device containing the data is stolen, the adversary will not be able to decrypt any of the encrypted data.

Figure 1:
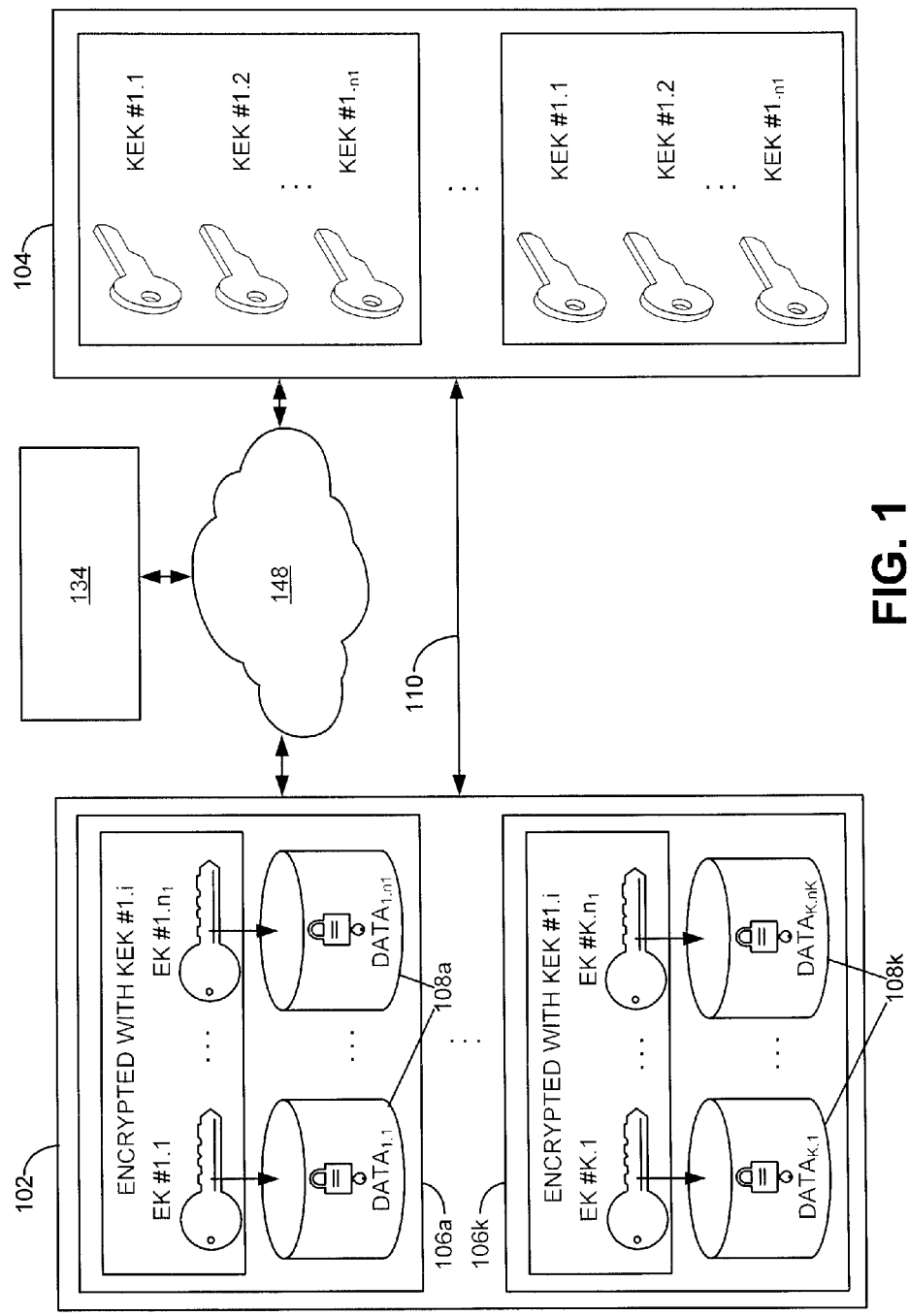
FIGS. 1 and 13 show block diagrams of a system for decoupling user authentication and data encryption, according to two embodiments.

Referring now to FIG. 1, there is shown one embodiment of a system 100 for encrypting data. The system 100 comprises two devices that serve different roles: one, a data container device ("DCD") 102, which is responsible for storing encrypted data and encrypted EKs; and two, a key vault device ("KVD") 104 responsible for storing KEKs. The DCD 102 sends a request to the KVD 104 when it needs a particular one of the KEKs to decrypt one of the encrypted EKs. This KEK is then used to decrypt its corresponding EK and, subsequently, the decrypted EK is used to decrypted the data encrypted using that EK. The DCD 102 may be, for example, a mobile device such as a smartphone or tablet; the KVD 104 may be, for example, a dongle carried by the mobile device's owner, or another smartphone or tablet as well.

Shown running on the DCD 102 is a first application, Application #1 106a, which encrypts and decrypts data as part of its normal operation. The data that Application #1 106a accesses is segmented into different data stores 108a, each of which is encrypted by a different EK. FIG. 1 shows n different encrypted data stores 108a for Application #1 106a, labelled $EK_{\#1.1}(DATA) \ldots EK_{\#1.n1}(DATA)$. Each of these data stores 108a is respectively encrypted using EK #1.1 ... EK #1.$n_1$, which are stored on the DCD 102. The EKs themselves are respectively encrypted using KEK #1.1 ... KEK #1.$n_1$, which are stored not on the DCD 102 but rather on the KVD 104. The DCD 102 and KVD 104 communicate via a wireless communication channel 110, the protocols for which are discussed in more detail below with respect to FIG. 3A. Any number of applications may be running on the DCD 102, as illustrated in FIG. 1 by Application #K 106k also running on the DCD 102, which accesses data stores 108k respectively encrypted using $EK_{\#k.1} \ldots EK_{\#k.nk}$, which themselves are respectively encrypted using KEK #k.1 ... KEK #k.$n_k$ (collectively, the applications are referred to as "applications 106" and the data stores are referred to as "data stores 108").

When one of the applications 106 needs to encrypt data that has not been encrypted before, it requests a set of symmetric keys, i.e. an EK and a KEK used to encrypt that EK, to be generated. The EK and KEK may be newly generated or may have been previously used. In response the portion of the system 100 running on the DCD 102 ("DCD resident component 114") generates the two keys and attempts to save the KEK on the KVD 104. The DCD resident component 114 runs in a trusted zone on the DCD 102, which is an independent computing platform that provides strong security guarantees and verifies the integrity of the applications 106 on every request, regardless of whether that request is to encrypt data or, as discussed in further detail below, to decrypt data or to delete keys. If the DCD resident component 114 determines that the integrity of the application 106 making a request has been compromised, the DCD resident component 114 denies the request.

If the save operation is successful, i.e., the new KEK was saved in the KVD 104, the portion of the system 100 resident on the DCD 102 returns an identification number, a four byte long word called a KEK_ID, for the newly generated set of keys; otherwise it notifies the application 106 that the save operation failed, and disregards the generated EK and KEK. If the save operation is successful, then the application 106 receives the EK and KEK_ID. The application 106 stores the EK only in its volatile memory (not shown), encrypts the data with the EK, and then removes the EK from its volatile memory. The KEK_ID is stored in the application 106's non-volatile memory (not shown) for future use in requesting the EK to decrypt the encrypted data.

When that application 106 wants to decrypt data it sends an asynchronous request to the DCD resident component 114 to conduct a decryption operation. With the request the application 106 also provides the KEK_ID for that data, which the application 106 had stored in its non-volatile memory. The DCD resident component 114 in turn determines whether the KEK identified by that KEK_ID is cached, and if it is not, attempts to fetch it from the KVD 104. If the KEK is successfully obtained either from a cache or from the KVD 104, then the DCD resident component 114 decrypts the EK with the KEK and returns the EK to the application 106. The application 106 stores the EK in its volatile memory, uses it to decrypt data, and then removes it from its volatile memory. If the KEK is not cached and the fetch operation fails, then the DCD resident component 114 notifies the application 106 that encryption or decryption is not currently possible. Alternatively, the DCD resident component 114 may perform data encryption and decryption itself and send encrypted and decrypted data to the applications 106.

The system 100 may be used in a variety of ways in today's mobile operating systems ("OSes"). Exemplary use cases include:

1. The applications 106 encrypt a user's credentials to provide "remember me" functionality.
2. The applications 106 encrypt a user's data stored within the application 106. For example, one of the applications 106 may be a picture gallery, in which case all pictures in the gallery would be encrypted and accordingly only accessible when the KVD 104 is available for requests from the DCD 102.
3. The OS of the DCD 102 encrypts the applications 106, thus making data encryption transparent for the applications 106.
4. A storage controller encrypts data storage in the data stores 108, thus making data encryption transparent to the OS.
5. A memory stick encrypts data storage in the data stores 108 and only decrypts the data if the KVD 104 is available for requests from the memory stick, which acts as the DCD 102.

One feature of the system 100 is that during EK retrieval operations users' interactions are optional; that is, it is at an application developer's discretion whether to request user interaction. Interaction may be useful for cases where few EKs are fetched and the application 106 wants to ensure that a person who possesses both the DCD 102 and KVD 104 did, in fact, request the encryption or decryption operation. Case 1 above is one example for such a case, i.e., the KEK is only needed when a user is about to authenticate herself to one of the applications 106. In order to ensure that the person who tries to open the application 106, she might be asked to press a button on the KVD 104 during the authentication process.

Figure 2:
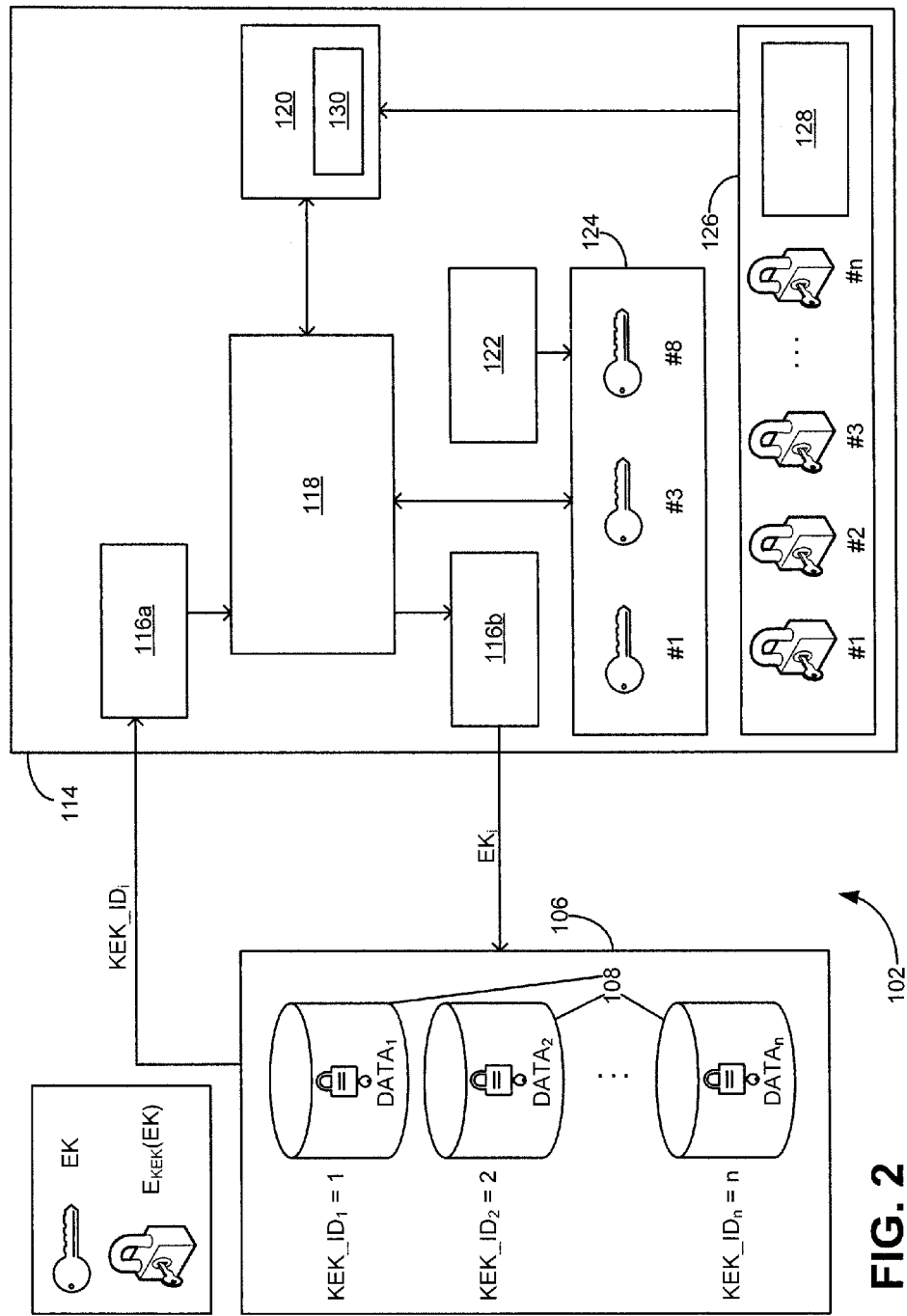
FIGS. 2 and 4 show block diagrams of exemplary data container devices comprising part of the system for decoupling user authentication and data encryption.

The design of the DCD resident component 114 is shown in FIG. 2. In FIG. 2, the application 106 has access to various exemplary encrypted data stores 108, $E_{EK1}(Data_1)$, $E_{EK2}(Data_2)$, to $E_{EKn}(Data_n)$, each of which is respectively encrypted using $EK_1$, $EK_2$, to $EK_n$, with each of the EKs being respectively encrypted using $KEK_1$, $KEK_2$, to $KEK_n$. The application 106 has direct access to KEK_IDs for each of the KEKs. As discussed above, the application 106 accordingly does not store the EKs in non-volatile memory, but does store the KEK_IDs in its non-volatile memory. As used hereinafter in this disclosure, KEK_ID, is the identifier for $EK_i$, and $EK_i$ is used to encrypt Data such that $E_{EKi}(Data_i)$ represents one of the encrypted data stores 108 and $E_{KEKi}(EK_i)$ is the encrypted EK used to encrypt that data store 108.

The application 106 is communicative with the DCD resident component 114. The DCD resident component 114 comprises request and response managers 116*a,b* (hereinafter collectively "managers 116"), a framework manager 118 that fetches EKs and KEKs, a KVD connection manager 120 that manages the connection between the DCD 102 and KVD 104 and that includes a watchdog timer 130, a link monitor 122, volatile memory 124, and non-volatile memory 126 that includes KVD pairing information 128.

The request manager 116*a* manages decryption and encryption requests from the application 106, while the response manager 116*b* sends decrypted EKs to the application 106. Both of the managers 116 are communicative with the framework manager 118. The framework manager 118 is also communicative with the volatile memory 124, which temporarily stores decrypted EKs, and with the KVD connection manager 120, which fetches KEKs from the KVD 104 to decrypt encrypted EKs stored in the non-volatile memory 126. The KVD pairing information 128 stored in the non-volatile memory 126 is responsible for establishing a long-term link between the KVD 104 and the DCD 102; in particular, the service ID ("SID") and the link key used to reconnect the DCD 102 and the KVD 104 are stored as the KVD pairing information 126. The link monitor 122 monitors the wireless communication channel 110 between the KVD 104 and the DCD 102; if the channel 110 closes, the link monitor 122 flushes the decrypted EKs from the volatile memory 124 to prevent the data stores 108 from being accessed when the KVD 104 and DCD 102 are not communicative with each other. In alternative embodiments such as those depicted in FIGS. 8 to 12, the decision whether to flush the decrypted EKs from memory may be made after considering additional factors.

When the application 106 wants to decrypt one of the data stores 108, it sends a request to the DCD resident component 114 with an operational code (OpCode) representing "decrypt" with the parameter being KEK_ID, to the request manager 116*a*. The request manager 116*a* forwards this request to the framework manager 118, which checks whether $E_{KEKi}(EK_i)$ has already been decrypted and $EK_i$ remains resident in the volatile memory 124. If $EK_i$ is in the volatile memory 124, the framework manager 118 retrieves $EK_i$ and sends $EK_i$ back to the application 106 via the response manager 116*b*. If $EK_i$ is not in the volatile memory 124, the framework manager 118 sends a request, containing $KEK\_ID_i$, to the KVD connection manager 120 to connect to the KVD 104 and to fetch $KEK_i$. $KEK_i$ is required to decrypt $EK_i$, which is stored in the non-volatile memory 126.

The KVD connection manager 120 checks to see whether the KVD 104 is authenticated using the data stored as the KVD pairing information 128; if it is not, the KVD 104 and DCD 102 negotiate a new session key, as described in more detail with respect to FIG. 3A below. Once the new session key is established, the KVD connection manager 120 sends a KEK request, comprising $KEK\_ID_i$, to the KVD 104 and waits for a response. Once $KEK_i$ is received, the KVD connection manager 120 returns it to the framework manager 118, which fetches $E_{KEKi}(EK_i)$ from the non-volatile memory 126, decrypts it using the $KEK_i$, saves $EK_i$ to the volatile memory 124, and deletes $KEK_i$ from memory. The framework manager 118 then sends $EK_i$ back to the application 106 via the response manager 116*b*.

While the foregoing describes a decryption operation, the DCD 102 and KVD 104 perform analogous operations when one of the applications 106 wants to encrypt data. Encryption and decryption operations are discussed in more detail in respect of FIGS. 4 and 5, below.

In the depicted embodiments the DCD 102 and KVD 104 communicate over the wireless communication channel 110 using the Bluetooth™ Low Energy ("BTLE") standard in the Bluetooth™ 4.0 specification. The BTLE standard satisfies two criteria desirable in a communication standard: first, it is energy efficient and requires relatively little maintenance from a user; and second, it does not require any user action (i.e. any active input from a user, such as pushing a button) for communication to occur. The BTLE standard may be implemented using a Texas Instruments™ CC2540 SoC, for example, which is a very low power IC. Any RF communications protocol, and in particular any power-efficient RF communications protocol, may be used to communicate between the DCD 102 and KVD 104.

The pairing protocol used to pair the KVD 104 and DCD 102 is designed to facilitate confidentiality of communication between the KVD 104 and DCD 102 and mutual authentication between the DCD 102 and KVD 104 during the pairing process.

To mitigate against the risk of an eavesdrop attack (an attack in which an adversary monitors the communications between the DCD 102 and KVD 104) end to end encryption of the communication between the DCD 102 and KVD 104 is used. However, before the communication can begin, the DCD 102 and KVD 104 establish a shared secret. Such a secret can be established through the Diffie-Hellman ("DH") protocol; however, this protocol does not provide protection against man-in-the-middle ("MITM") attacks.

The Bluetooth™ 4.0 core specification defines the Secure Simple Pairing protocol ("SSPP") that aims to mitigate both of the aforementioned attacks, i.e., passive eavesdropping, and MITM. In Bluetooth™ base rate ("BTBR") there are four association models, which are models of how two devices such as the KVD 104 and DCD 102 establish a linked connection over the wireless communication channel 110:

1. Numeric Comparison—in this association model both devices negotiate a number and that number is shown on the devices' displays. The user is then asked to compare these numbers and answer a yes/no question regarding whether these numbers are the same.
2. Just Works—the devices connect to each other automatically without requiring any user action. This association model is often used when at least one of the devices has very limited input/output resources, such as a device that does not have a keyboard or a display. This model does not provide protection against an MITM attack.
3. Out of Bound (OOB)—this model uses another, non-Bluetooth™, channel for mutual authentication. E.g., Near Field Communication ("NFC") could be used for the mutual authentication process.
4. Passkey Entry—this model requires users to type the same authentication secret on both devices. This association model is only used when both devices have some input capabilities (e.g., keyboard, video, audio, accelerometer, etc.). The main difference between this model and OOB is that OOB does not rely on users to generate the authentication secret or input it; instead the authentication secret exchange is done automatically. In Passkey Entry users are required to enter the authentication secret on at least one of the devices.

Unfortunately, BTLE does not support all these association models. In particular, it does not support the Numeric Comparison model, due to assumed limited display capabilities of the BTLE devices. Furthermore, the Just Works and Passkey Entry association models do not provide protection even against a passive eavesdropper, because BTLE does not use the DH protocol for session key establishment. The DCD 102 and KVD 104 do not adopt the Just Works association model due to its insufficient security guarantees nor the basic specification and implementation of the Passkey Entry association model, since it does not protect against an MITM attack.

To mitigate the eavesdropping and MITM attacks the KVD 104 and DCD 102 communicate using a pairing protocol that allows for mutual authentication between the DCD 102 and the KVD 104. In addition, this pairing protocol establishes a strong secure session key ("S3K") using the DH protocol. FIG. 3A depicts one embodiment of the pairing protocol.

Figure 3A:
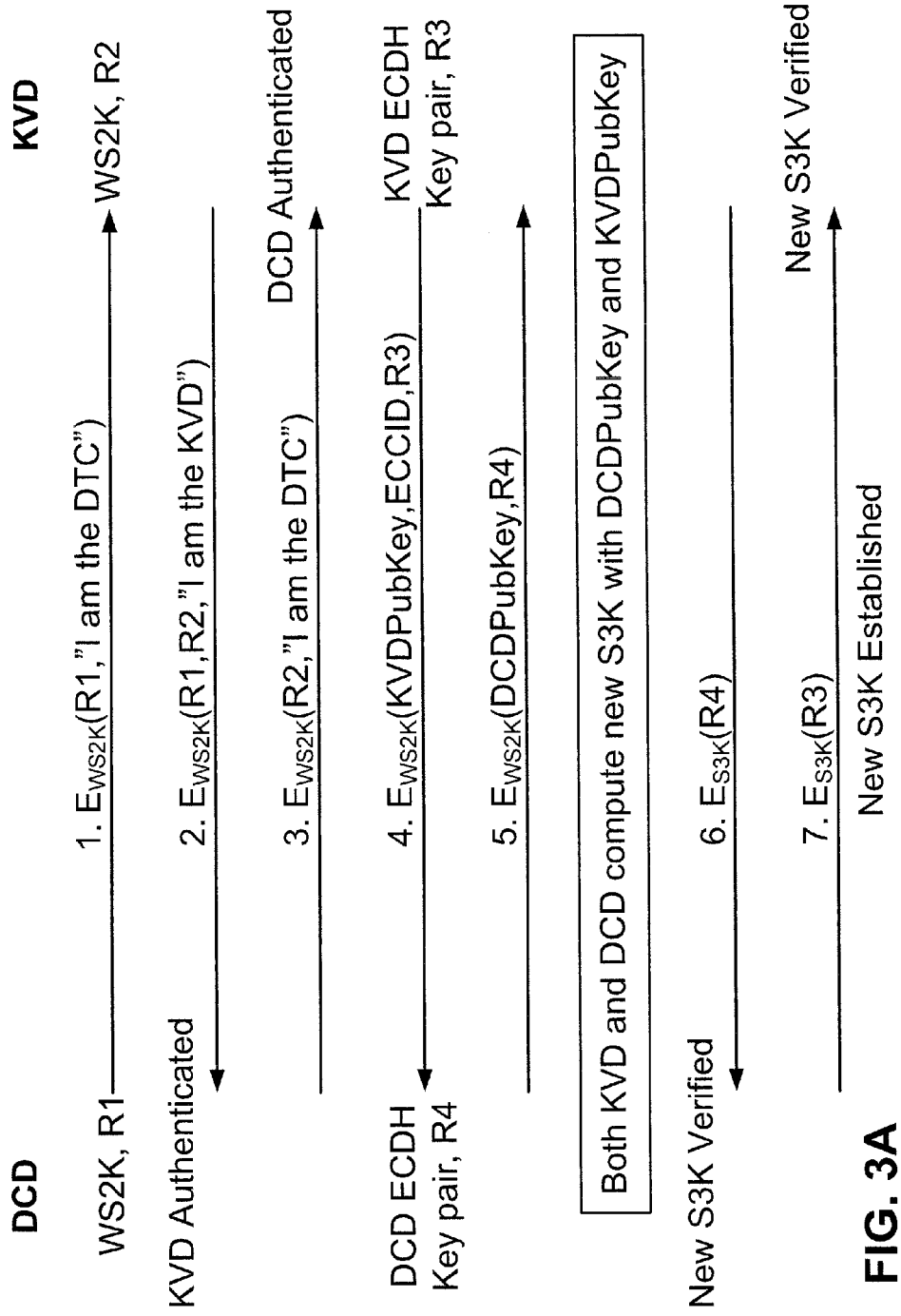
FIG. 3A shows an exemplary method for pairing the data container device and a key vault device, which also comprises part of the system for decoupling user authentication and data encryption.

In order to mitigate against an MITM attack during pairing either the OOB or Passkey Entry association models are used to generate the same weak shared secret key ("WS2K") on both the DCD 102 and KVD 104 prior to step 1 in FIG. 3A. For the Passkey Entry model, a custom protocol, similar to the implementation of SSPP for BT BDR/EDR, is used. Users enter the same WS2K on both the DCD 102 and KVD 104 if both the DCD 102 and KVD 104 can prompt for and accept user input (e.g., when the DCD 102 and KVD 104 are tablets or smartphones, users are presented with a prompt to enter their WS2K on both devices). If the KVD 104 is a device with poor input capabilities, alternative approaches for entering the WS2K are adopted. In one approach, the DCD 102 presents instructions for a user which show the sequence of N buttons clicks on the KVD 104. For a KVD 104 that has only two buttons, the number of times one of the button is clicks directly corresponds to the entropy of the WS2K.

In another approach the system 100 relies on accelerometers within the DCD 102 and KVD 104. The user is asked to put the two DCD 102 and KVD 104 together in one hand and rotate them both randomly in four directions for a specified period of time. This approach produces similar accelerometer data in both of the DCD 102 and KVD 104, which is passed to a WS2K derivation method in both of the DCD 102 and KVD 104.

For the OOB association model, any of the following four methods is used to generate the WS2K:
1. a Quick Response ("QR") Code is generated on one of the DVD 102 and KVD 104 and scanned on the other;
2. one of the DVD 102 and KVD 104 generates a vibration pattern and the other of the DVD 102 and KVD 104 reads it and decodes the WS2K from it;
3. NFC communication between the DVD 102 and KVD 104; and
4. wired connection of both of the DVD 102 and KVD 104 to a PC.

Overall, the pairing protocol comprises:
1. Strong mutual authentication (steps 1 to 3 of FIG. 3); and
2. S3K establishment (steps 4 to 7 of FIG. 3).

The main objective of strong mutual authentication is to mitigate risk of an MITM attack. By authenticating the DVD 102 and KVD 104, strong mutual authentication helps ensure that no one is eavesdropping on communications between the DVD 102 and KVD 104 that the user is about to pair. Once the WS2K is established, at step 1 the DCD 102 sends challenge data R1 along with the message "I am the DTC" to the KVD 104. At step 2 the KVD 104 sends back to the DCD 102 the challenge data R1, new challenge data R2, and the message "I am the KVD". Upon receiving this message the DCD 102 authenticates the KVD 104 and sends back to the KVD 104, at step 3, the challenge data R2 and the message "I am the DTC". Upon receiving this message the KVD 104 authenticates the DCD 102. At step 4 the KVD 104 sends to the DCD 102 its public key (KVDPubKey), its ECCID (NIST Elliptic Curve ID), and new challenge data R3. The DCD 102 responds at step 5 by sending to the KVD 104 its public key (DCDPubKey) and new challenge data R4. Each of the DCD 102 and KVD 104 then determine a new S3K using DCD-PubKey and KVDPubKey according to the Elliptic Curve Diffie-Helman ("ECDH") protocol. Establishing an S3K is done to mitigate the inherited weaknesses of user typed authentication secrets. The ECDH protocol is used to establish the S3K because it is a better fit for resource constrained devices, such as smartphones, tablets or SOCs. In steps 6 and 7 of FIG. 3A, the DCD 102 and KVD 104 respectively verify the S3K generated between steps 5 and 6 by encrypting and then decrypting challenge data R4 and R3. The messages transmitted at steps 1 through 5 of FIG. 3A are encrypted using the WS2K, while the messages transmitted at steps 6 and 7 are encrypted using the S3K.

The pairing may optionally be named to reduce the probability of name clashes in the Bluetooth™ network and to increase the speed of discovery of and reconnection to the KVD 104. The KVD 104, when unpaired, only knows two constant UUIDs: the UUID of the system 100, and the UUID of the system 100 pairing characteristic. Once the KVD 104 is paired, it still uses the UUID of the system 100 when it advertises its presence, but it uses a randomly assigned value as a pairing characteristic. The DCD 102, which assigns this value during the pairing process, then knows which device it needs to look for. These UUIDs are assumed to be public information and accordingly are not encrypted during transfer.

Figure 3B:
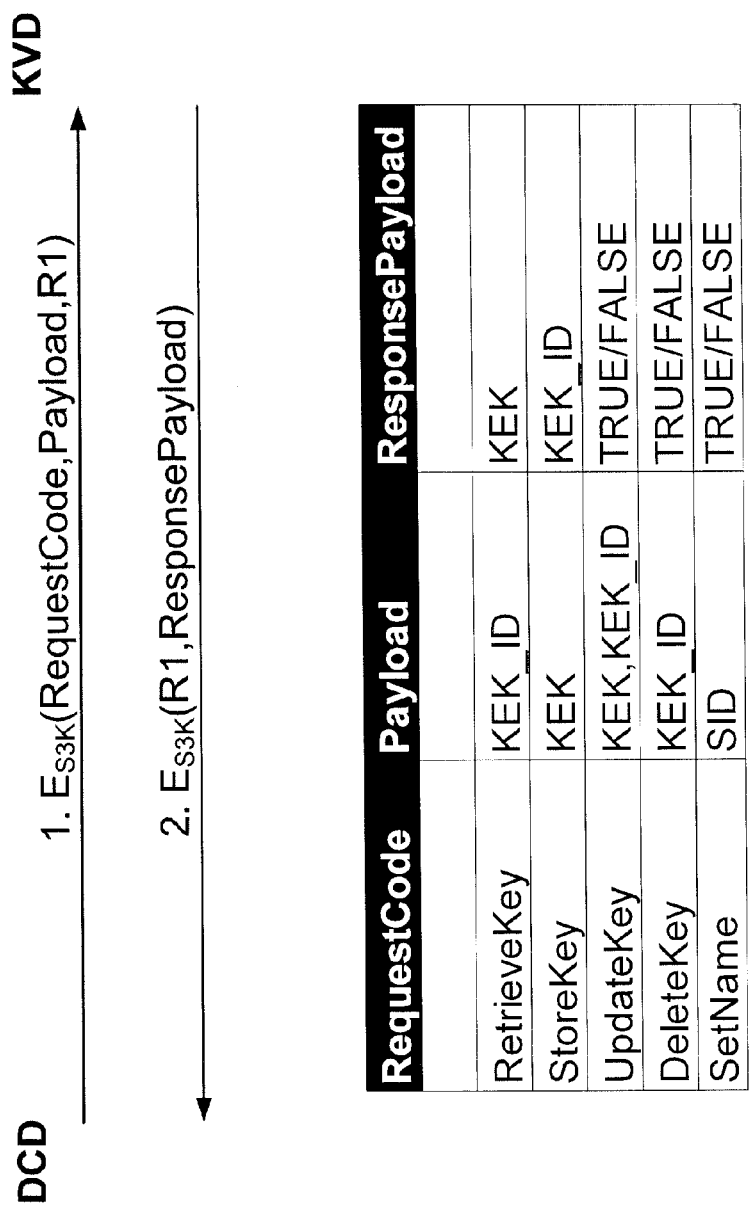
FIG. 3B shows exemplary request and response exchanges between the data container device and the key vault device.

FIG. 3B shows an exemplary request and response between the DCD 102 and the KVD 104. At step 1, the DCD 102 sends an encrypted RequestCode, which is a particular type of OpCode, along with an encrypted payload and encrypted challenge data R1. The KVD 104 responds with the encrypted R1 and an encrypted response ResponsePayload. The table in FIG. 3B shows exemplary RequestCodes and payloads, sent from the DCD 102 to the KVD 104, and ResponsePayloads returned by the KVD 104.

Each of the EKs and KEKs periodically expire, for example on a per session (between the DCD 102 and KVD 104) basis, after a certain amount of time, or after certain events as shown in FIGS. 8 to 12, which reduces the risk that a cloning attack can be successfully used to access the data on the DCD 102.

Figure 4:
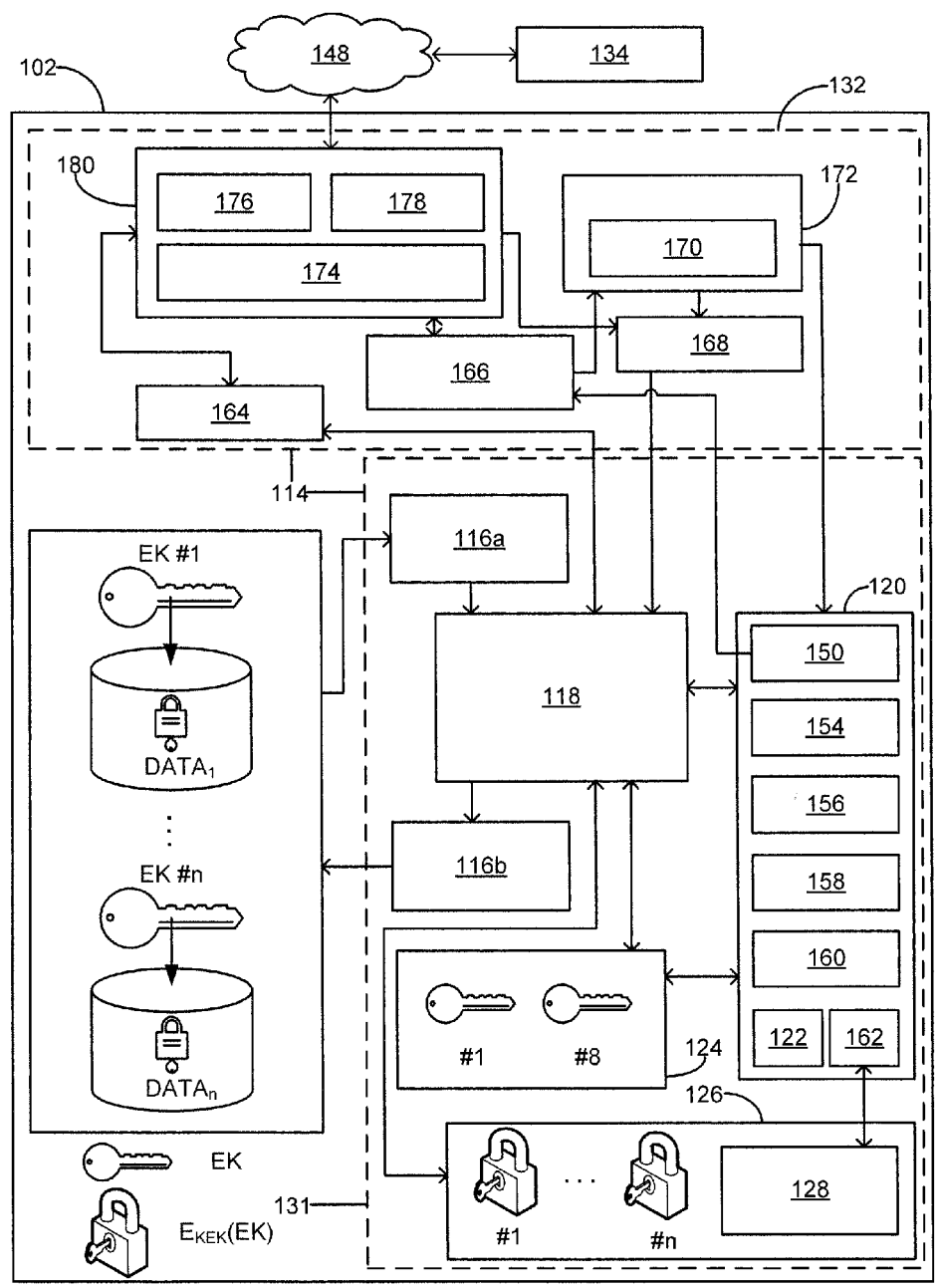

Referring now to FIG. 4, here is shown another embodiment of the DCD 102 and, in particular, the DCD resident component 114 of the system 100. The DCD 102 of FIG. 4 is similar to the DCD 102 of FIG. 2, with the exceptions that the KVD connection manager 120 of FIG. 4 is shown with different functionality, the link monitor 122 has been incorporated into the connection manager 120, and the DCD resident component 114 includes a DCD health agent 132 to interface with a key vault system manager ("KVSM") 134. The additional functionality shown in the connection manager 120 includes statements and instructions to cause the KVD connection manager 120 to perform the actions depicted in FIG. 3A to pair the DCD 102 and KVD 104 and in FIG. 3B to permit communication between the DCD 102 and KVD 104.

The connection manager 120 comprises a KVD health agent 150, a link key manager 154 that includes KVD authentication logic, a session key manager 156 that utilizes the ECDH protocol, a KEK operation dispatcher 158, a wireless channel manager 160, the link monitor 122, and a pairing module 162 that performs pairing logic. The pairing logic 162 is communicative with the KVD pairing information 128 stored in the non-volatile memory 126.

The DCD health agent 132 comprises a backup/restore agent 164 communicative with the framework manager 118; a DCD system monitor agent 166 communicative with the KVD health agent 150; a data wipe/fade manager 168 communicative with the framework manager 118; an intelligent agent 172, comprising security policy and rules 170, communicative with the KVD connection manager 120, data wipe and fade manager 168, and DCD system monitor agent 166; and a KVSM connection manager 180, comprising a link certificate manager 176 with KVSM authentication logic, a session key manager 178 utilizing the ECDH protocol, and a wireless channel manager 174, communicative with the data wipe/fade manager 168, DCD system monitor agent 166, and backup/restore agent 164. The KVSM connection manager 180 is also the component of the DCD 102 via which the DCD 102 communicates with the KVSM 134 via a network 148. Those components of the DCD resident component 114 not comprising part of the DCD health agent comprise part of a DCD data encryption framework 131.

The various components of the DCD 102 operate as follows:

1. Applications 106. The applications 106 communicate with the DCD data encryption framework 131 by sending instructions to encrypt or decrypt data or to delete keys. The applications 106 send messages to the request manager 116a that comprise an OpCode and message parameters. The applications 106 receive responses from the response manager 116b comprising an OpResult.
   (a) To encrypt $Data_i$, the applications 106 send the Encrypt OpCode and $KEK\_ID_i$ to the framework manager 118 via the request manager 116a. The applications 106 receive from the framework manager 118 via the response manager 116b
   (b) To decrypt $E_{EKi}(Data_i)$, the applications 106 send the Decrypt OpCode and $KEK\_ID_i$ to the framework manager 118 via the request queue 116a and receive $EK_i$ from the framework manager 118 via the response manager 116b. The applications 106 use $EK_i$ to decrypt $E_{EKi}(Data_i)$ in the applications' 106 volatile memory and do not store $EK_i$ after decryption has been performed. In an alternative embodiment (not depicted), the applications 106 send $KEK\_ID_i$, $E_{EKi}(Data_i)$, and the Decrypt OpCode to the framework manager 118, which decrypts $E_{EKi}(Data_i)$ and returns Data to the applications 106.
   (c) To delete keys the applications 106 send the Delete OpCode and $KEK\_ID_i$ to the framework manager 118 via the request queue 116a. The framework manager 118 then deletes $KEK_i$ and $EK_i$ from the volatile memory 124 and non-volatile memory 126. Even if Data remains stored in the applications' 106 non-volatile memory it will not be cryptographically accessible. Optionally, the applications 106 may delete Data to free non-volatile memory.

2. Request manager 116a. The request manager 116a receives requests from the applications 106 and relays them to the framework manager 118. The request manager 116a is able to prioritize requests from some of the applications 106.

3. Response manager 116b. The response manager 116b receives responses from the framework manager 118 and relays them to the applications 106.

4. Framework manager 118. The framework manager 118 is responsible for the following:
   (a) Encrypting. To encrypt, the framework manager 118
      (i) receives, from one of the applications 106 via the request manager 116a, an encryption request and a number (k) identifying which of the applications 106 sent the request;
      (ii) randomly generates $EK_i$;
      (iii) randomly generates $KEK_i$, which identifies $EK_i$;
      (iv) receives from the KEK operation dispatcher 158 $KEK\_ID_i$, which is an integer that uniquely identifies $KEK_i$ and, in turn, $Data_i$;
      (v) encrypts $EK_i$ using $KEK_i$ to create $E_{KEKi}(EK_i)$;
      (vi) stores $KEK\_ID_i$ and $E_{KEKi}(EK_i)$ in the non-volatile memory 126;
      (vii) stores $KEK\_ID_i$ and $EK_i$ in the volatile memory 124;
      (viii) sends $EK_i$, $KEK\_ID_i$, and k to the response manager 116b, which sends $EK_i$ and $KEK\_ID_i$ to the application 106 that requested Data be encrypted; and
      (ix) sends $EK_i$, $KEK\_ID_i$, and k to the backup/restore agent 164.
   (b) Decrypting $E_{EKi}(Data_i)$. To decrypt $E_{EKi}(Data_i)$, the framework manager 118
      (i) receives $KEK\_ID_i$ and k from one of the applications 106 via the request manager 116a;
      (ii) attempts to retrieve $EK_i$ from the volatile memory 124 using $KEK\_ID_i$, and if successful forwards $EK_i$ and k to the response manager 116b to permit the application 106 to decrypt $E_{EKi}(Data_i)$; and
      (iii) if $EK_i$ cannot be retrieved from the volatile memory 124, uses $KEK\_ID_i$ to retrieve $E_{KEKi}(EK_i)$ from the non-volatile memory 126, stores $KEK\_ID_i$ and $EK_i$ in the volatile memory 124, and forwards $EK_i$ and k to the response manager 116b to permit the application 106 to decrypt $E_{EKi}(Data_i)$.

Figure 14:
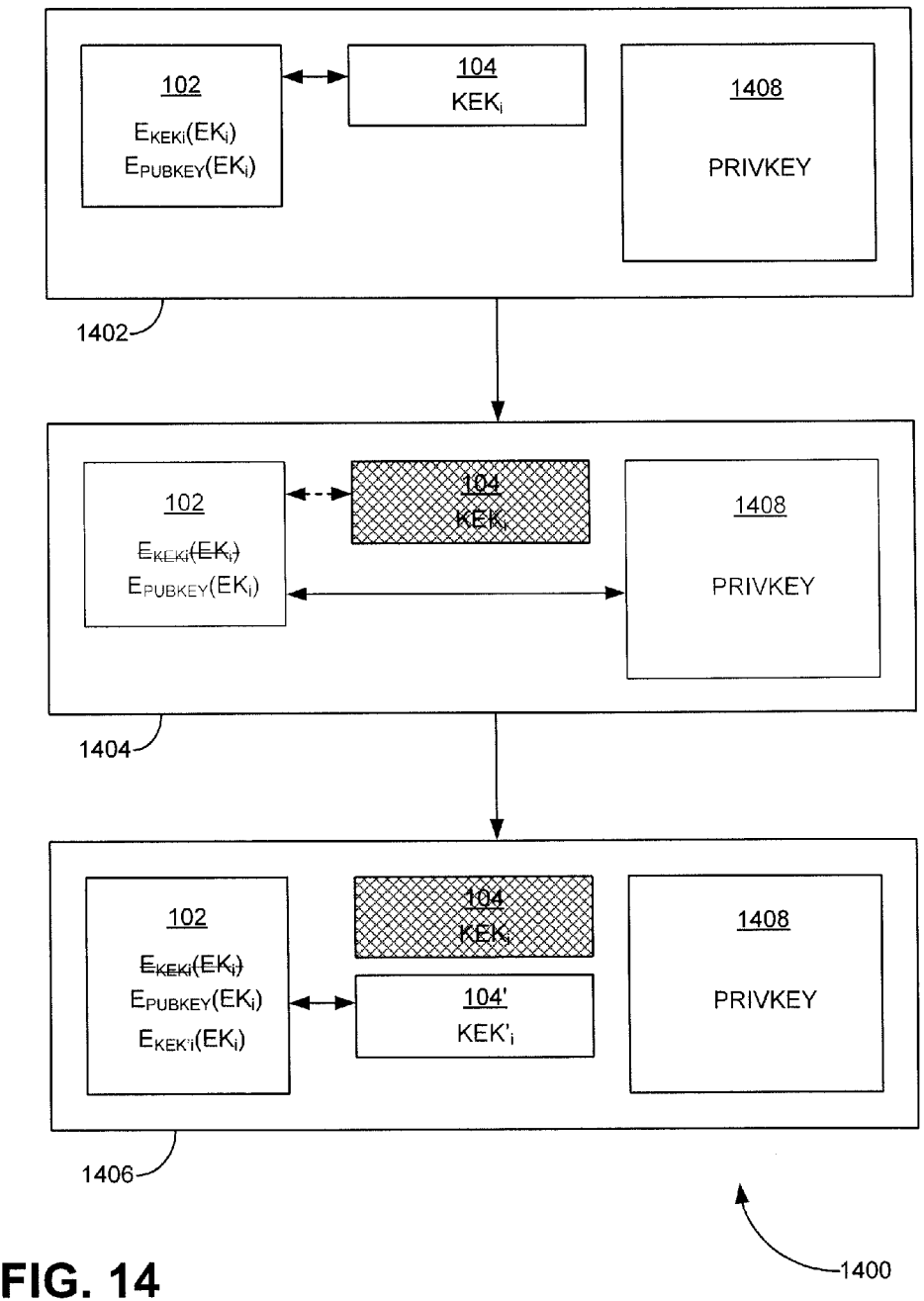
FIG. 14 shows a block diagram depicting a key restoration process, according to another embodiment.

(c) Deleting Keys. To delete keys because of instructions to do so from the data wipe/fade manager 168, the framework manager 118
  (i) receives KEK_ID$_i$ and instructions to delete keys from the data wipe/fade manager 168;
  (ii) deletes KEK_ID$_i$ and EK$_i$ from the volatile memory 124;
  (iii) deletes KEK_ID$_i$ and E$_{KEKi}$(EK$_i$) from the non-volatile memory 126;
  (iv) sends a request to the KEK operation dispatcher 158 with KEK_ID$_i$ to delete KEK$_i$ from the KVD 104; and
  (v) sends to the response manager 116b k and KEK_ID$_i$ to allow the response manager 116b to instruct the application 106 controlling Data to delete Data$_i$, if desired, to free space in the applications' 106 non-volatile memory.
(d) Sends and receives KEKs and KEK_IDs to and from the KEK operation dispatcher 158.
(e) Communicates with the backup/restore agent 164. The framework manager 118 sends backup and restore requests to the backup/restore agent 164. To backup KEK$_i$, the framework manager 118 sends KEK$_i$, KEK_ID$_i$, and k to the backup/restore agent 164. To restore KEK$_i$, a method such as that described below in respect of FIG. 14 is performed.

5. KVD Connection Manager 120. The KVD connection manager 120 creates a secure connection to the KVD 104. The KVD connection manager 120 comprises the following modules:
  (a) Link key manager 154. The link key manager 154 performs authentication logic as described above in respect of steps 1 through 3 of FIG. 3A.
  (b) Session key manager 156. The session key manager 156 generates the S3K using the ECDH protocol as described above in respect of steps 4 through 7 of FIG. 3A.
  (c) KEK operation dispatcher 158. The KEK operation dispatcher 158 is responsible for communication between the framework manager 118 and the KVD 104 once authentication is successful and the S3K is established. The KEK operation dispatcher 158 can perform the following operations:
    (i) Store. The store operation allows KEK$_i$ to be stored in the KVD 104. The KEK operation dispatcher 158 receives KEK$_i$ from the framework manager 118, sends a store request along with KEK$_i$ to the KVD 104, receives KEK_ID$_i$ from the KVD 104, and returns KEK_ID$_i$ to the framework manager 118. The store operation corresponds to the StoreKey RequestCode of FIG. 3B.
    (ii) Fetch. The fetch operation allows KEK$_i$ to be retrieved from the KVD 104. The KEK operation dispatcher 158 receives KEK_ID$_i$ from the framework manager 118, sends a fetch request along with KEK_ID$_i$ to the KVD 104, receives KEK$_i$ from the KVD 104, and returns KEK$_i$ to the framework manager 118. The fetch operation corresponds to the RetrieveKey RequestCode of FIG. 3B.
    (iii) Delete. The delete operation allows KEK$_i$ to be deleted from the KVD 104. The KEK operation dispatcher 158 receives KEK_ID$_i$ from the framework manager 118, sends a delete request along with KEK_ID$_i$ to the KVD 104, receives confirmation from the KVD 104 that KEK$_i$ has been deleted, and confirms to the framework manager 118 that deletion has occurred. The delete operation corresponds to the DeleteKey RequestCode of FIG. 3B.
    (iv) Update. The update operation is performed during key restoration as described below in respect of FIG. 14. The KEK operation dispatcher 158 receives a new KEK$_i$ for KEK_ID$_i$, sends an update request with KEK$_i$ and KEK_ID$_i$ to the KVD 104, receives confirmation from the KVD 104 that the new KEK_ID$_i$ has been associated with KEK$_i$, and relays this confirmation to the framework manager 118. The update operation corresponds to the UpdateKey RequestCode of FIG. 3B.
  (d) Wireless channel manager 160. The wireless channel manager 160 manages RF communication between the DCD 102 and KVD 104.
  (e) Pairing logic 162. The pairing logic comprises statements and instructions to implement the pairing protocol as described in respect of FIG. 3A, above.
  (f) Link monitor 122. The link monitor 122 monitors the connection between the DCD and KVD 104. In one embodiment, as soon as the connection is lost, as a safety precaution the link monitor 122 flushes the volatile memory 124 so that the EKs are no longer available for decryption. Should EK$_i$ be subsequently required and not available in the volatile memory 124 KEK$_i$ is fetched from the KVD 104 to decrypt the E$_{KEKi}$(EK$_i$) stored in the non-volatile memory 126.
  (g) KVD health agent 150. The KVD health agent 150 communicates with an analogous DCD health agent 151 comprising part of the KVD 104 to receive updates on the KVD 104's status, and sends these status updates to the DCD system monitor agent 166. The KVD health agent 150 also receives updates on the DCD 102's health from the intelligent agent 172 and relays these updates to the DCD health agent 151 on the KVD 104. Health updates comprise information such as the status S$_i$ of each of the DCD 102 and KVD 104, as determined using the exemplary methods of FIGS. 8 to 12.

6. DCD system monitor agent 166. The DCD system monitor agent 166 gathers information about the current states of the DCD 102 and KVD 104 by, for example:
  (a) receiving information from the DCD 102's sensors, such as whether a WiFi signal is available, current location as determined via a GPS sensor, and the DCD 102's orientation as determined using a gyroscope or accelerometer;
  (b) receiving information from the KVSM 134 via the KVSM connection manager 180 regarding, for example, the health state of the KVD 104, the DCD 102, or both;
  (c) receiving information from the KVD health agent 150 on the status of the KVD 104; and
  (d) aggregating the information collected in subparagraphs (a)-(c) and sending the aggregated information to the intelligent agent 172 and the KVSM connection manager 180 for more detailed analysis.

7. Intelligent agent 172. The intelligent agent 172 analyzes the health state of the DCD 102. The intelligent agent 172
  (a) receives information from the DCD system monitor agent 166;
  (b) stores security policy and rules as the security policy and rules 170;
  (c) determines the current state of the DCD 102; and
  (d) sends instructions to the wipe/fade manager 170 to wipe or fade data based on the current state of the DCD 102. If after time t$_i$ the DCD 102 remains in state S$_i$, the intelligent agent 172 instructs the wipe/fade manager 170 to delete the keys used to encrypt data having priority p$_i$ ... p$_j$. State S$_0$ is considered a safe state in which data is stored indefinitely.

Based on the security policy and rules 170, the intelligent agent 172 assigns the encrypted data stored by the applications 106 a priority level selected from $p_i$, $P_2$, ... $p_n$. These priority levels are sent to the KVD 104 either directly via the wireless connection 110 or indirectly via the KVSM 134. Level $p_1$ represents the most confidential or sensitive data while level $p_n$ represents the least confidential or sensitive data. The security policy and rules 170 may be loaded on to the DCD 102 in any one of a variety of suitable ways, such as by being pushed by the applications 106, pushed by the KVSM 134, or created by the intelligent agent 172 itself after monitoring operation of the DCD 102.

The intelligent agent 172 has states $S_1$, $S_2$, ... $S_n$, which correspond respectively to priority levels $p_1$, $P_2$, ... $p_n$. The intelligent agent 172 has access to input from the DCD system monitor agent 166, the KVSM 134 and to the security policy and rules 170 and from these determines whether to wipe the data from the DCD 102 to prevent it from being surreptitiously accessed. The intelligent agent 172 uses artificial intelligence or machine learning methods to determine the health status of the DCD 102. The intelligent agent 172 uses active learning to interactively obtain data from the DCD system monitor agent 166 to make decisions about the state of the DCD 102. The intelligent agent 172 then uses any suitable classification method such as Bayesian networks, Markov networks, decision trees, support vector machines, or neural networks on the data that the DCD system monitor agent 166 outputs to learn and periodically update the model used to determine the health status of the DCD 102. Inference methods can be run on these models to determine the probability of the DCD 102 being in different states.

8. Wipe/fade manager 170. The wipe/fade manager 170 instructs the framework manager 118 to wipe or fade keys in response to instructions from the KVSM connection manager 180 or the intelligent agent 172. Regardless of the source of the instructions, the wipe/fade manager 170 receives a command to wipe/fade KEK_$ID_i$, which it relays to the framework manager 118. The framework manager 118 can obtain $EK_i$ from either the volatile memory 124 or by decrypting $E_{KEKi}(EK_i)$ after obtaining $KEK_i$ via the KEK operation dispatcher 158, following which it can instruct the applications 106 to delete $Data_i$. The framework manager 118 deletes KEK_$ID_i$ and $EK_i$ from the volatile memory 124, deletes KEK_$ID_i$ and $E_{KEKi}(EK_i)$ from the non-volatile memory 126, and instructs the applications 106 to delete $Data_i$, as discussed above.

9. Backup/restore agent 164. The backup/restore agent 164 is used to backup to or restore keys from cloud storage; that is, to back up to or restore keys from the KVSM 134. To backup keys, the backup/restore agent 164 receives a backup request from the framework manager 118, which comprises $KEK_i$, KEK_$ID_i$, and k. The backup/restore agent 164 then sends $KEK_i$, KEK_$ID_i$, and k to the KVSM connection manager 180 for transmission to and storage in the KVSM 134. To restore keys, the method described in respect of FIG. 14, below, may be performed.

10. KVSM connection manager 180. The KVSM connection manager 180 is responsible for securely communicating with the KVSM 134. The KVSM connection manager 180 comprises the following modules:

(a) Link certificate manager 176. The link certificate manager 176 performs authentication logic using an SSL certificate instead of the WS2K in order to authenticate KVSM 134. After the authentication is complete, the key establishment logic is the same as between the KVD 104 and DCD 102.

(b) Session key manager 178. The session key manager 178 generates the S3K using the ECDH protocol as described above in respect of steps 4 through 7 of FIG. 3A, except that instead of the DCD 102 and KVD 104 generating the S3K, the DCD 102 and KVSM 134 generate the S3K, respectively.

(c) Wireless channel manager 174. The wireless channel manager 174 manages RF communication between the DCD 102 and KVSM 134.

Figure 5:
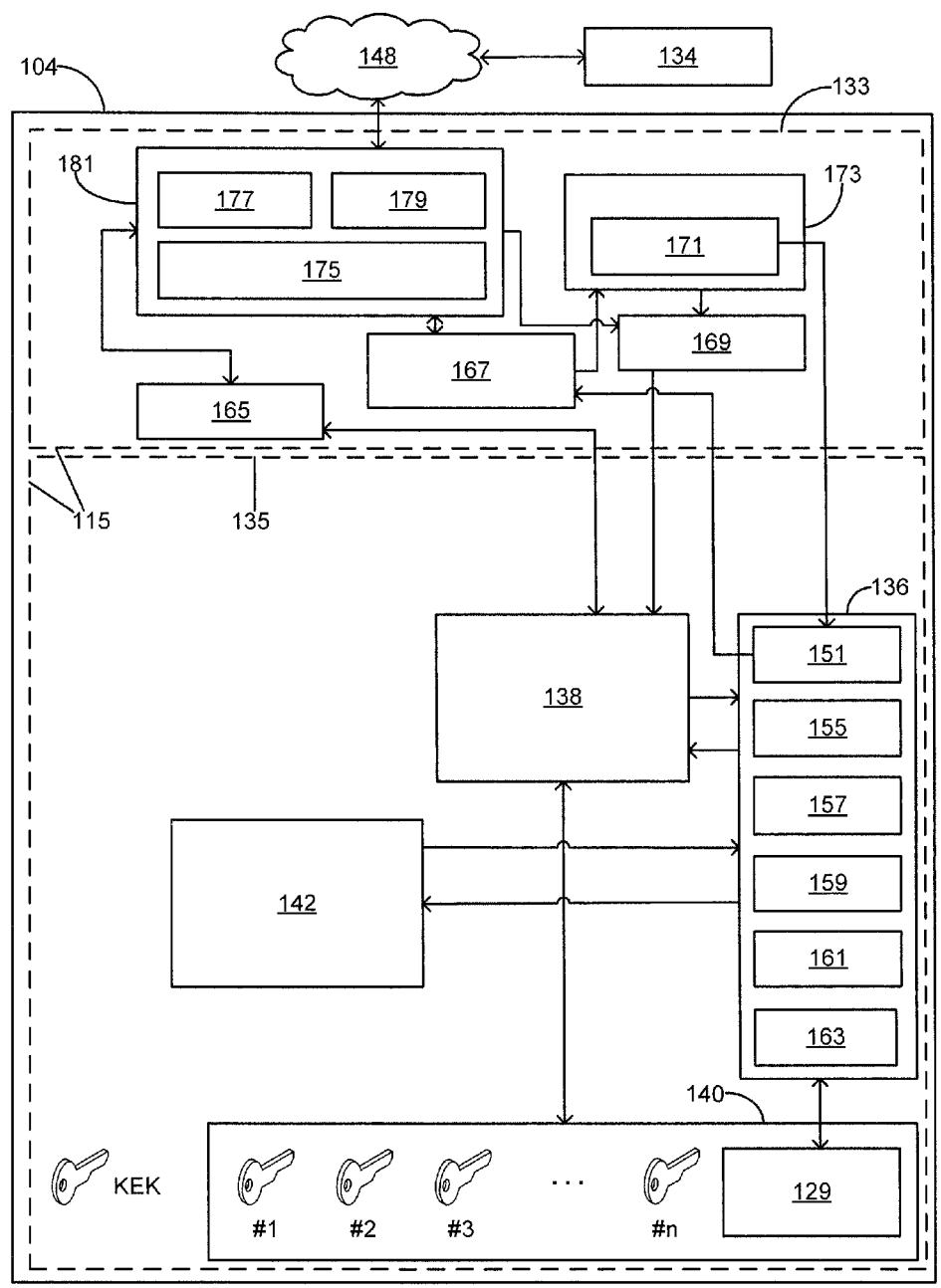
FIG. 5 shows a block diagram of the key vault device.

FIG. 5 shows an embodiment of the KVD 104 and, in particular, a portion of the system 100 that is resident on the KVD 104 ("KVD resident component 115"). The KVD resident component 115 comprises a KVD health agent 133, which is analogous to the DCD health agent 132 of the DCD resident component 114, and a KVD data encryption framework 135, which is analogous to the DCD data encryption framework 131 of the DCD resident component 114. The KVD data encryption framework 135 comprises a KEK manager 138, non-volatile memory 140 that stores KEKs and DCD pairing information 129, a DCD connection manager 136 that is analogous to the KVD connection manager 135, and a user interface 142. The KEK manager 138 is communicative with the non-volatile memory 140, the DCD connection manager 136, and with a backup/restore agent 165 and data wipe/fade manager 169 that each comprises part of the KVD health agent 133. The DCD connection manager 136 and user interface 142 are communicative with each other. The user interface 142 comprises input/output interfaces such as buttons, a display, lights, switches, an accelerometer, and a gyroscope to allow users to provide input that may be used to generate the WS2K as described above in respect of FIG. 3A.

The DCD connection manager 120 comprises a DCD health agent 151, a link key manager 155 that includes DCD authentication logic, a session key manager 157 that utilizes the ECDH protocol, a KEK operation dispatcher 159, a wireless channel manager 161, and a pairing module 163 that performs pairing logic. The pairing module 163 is communicative with the DCD pairing information 129 stored in the non-volatile memory 140. The KVD health agent 150, link key manager 154, session key manager 156, KEK operation dispatcher 158, wireless channel manager 160, and pairing module 162 are analogous in functionality to the DCD health agent 151, the link key manager 155, the session key manager 157, the KEK operation dispatcher 159, the wireless channel manager 161, and the pairing module 163, respectively, on the DCD 102.

The KVD health agent 133 comprises a backup/restore agent 165 communicative with the KEK manager 138; a KVD system monitor agent 167 communicative with the DCD health manager 151; a data wipe and fade manager 169 communicative with the KEK manager 138; an intelligent agent 173, comprising security policy and rules 171, communicative with the DCD connection manager 136, data wipe/fade manager 169, and KVD system monitor agent 167; and a KVSM connection manager 181, comprising a link certificate manager 177 with KVSM authentication logic, a session key manager 179 utilizing the ECDH protocol, and a wireless channel manager 175, communicative with the data wipe and fade manager 169, KVD system monitor agent 167, and backup/restore agent 165. The KVSM connection manager 181 is also the component of the KVD 104 via which the KVD 104 communicates with the KVSM 134 via the network 148.

The various components of the KVD 104 operate as follows:
1. KEK manager 138. The KEK manager 138 is responsible for the following:
   (a) Responding to requests from the KEK operation dispatcher 159. As discussed above in respect of the KEK operation dispatcher 158 for the KVD connection manager 120, the KEK operation dispatchers 158,159 are used to store, fetch, delete, and update KEKs into and from the non-volatile memory 140. In the KVD 104, these operations are performed via the KEK manager 138 analogous to how they are performed via the framework manager 118 in the DCD 102.
   (b) Deleting $KEK_i$. To delete $KEK_i$ because of instructions to do so from the data wipe/fade manager 169, the KEK manager 138
      (i) receives $KEK\_ID_i$ and instructions to delete $KEK_i$;
      (ii) deletes $KEK\_ID_i$ and $KEK_i$ from the non-volatile memory 140; and
      (iii) sends a request to the KEK operation dispatcher 159 to delete $KEK\_ID_i$ from the DCD 102.
   (c) Communicates with the backup/restore agent 164. The KEK manager 138 sends backup and restore requests to the backup/restore agent 165. To backup keys, the KEK manager 138 sends $KEK_i$, $KEK\_ID_i$, and k to the backup/restore agent 164. To restore $KEK_i$, a method as described below in respect of FIG. 14 may be performed.
2. DCD Connection Manager 136. The DCD connection manager 136 creates a secure connection to the DCD 102. The DCD connection manager 136 comprises the following modules:
   (a) Link key manager 155. The link key manager 155 performs authentication logic as described above in respect of steps 1 through 3 of FIG. 3A.
   (b) Session key manager 157. The session key manager 157 generates the S3K using the ECDH protocol as described above in respect of steps 4 through 7 of FIG. 3A.
   (c) KEK operation dispatcher 159. The KEK operation dispatcher 159 is responsible for communication between the KEK manager 138 and the DCD 102 once the authentication is successful and the S3K is established. The KEK operation dispatcher 159 can perform the following operations:
      (i) Store. The store operation allows $KEK_i$, received from the DCD 102, to be stored in the non-volatile memory 140. The KEK operation dispatcher 159 receives a store request and $KEK_i$ from the DCD 102, and returns $KEK\_ID_i$ to the DCD 102. The KEK operation dispatcher 159 obtains $KEK\_ID_i$ using the KEK manager 138. The store operation corresponds to the StoreKey RequestCode in FIG. 3B.
      (ii) Fetch. The fetch operation allows $KEK_i$ to be retrieved from the non-volatile memory 140. The KEK operation dispatcher 159 receives $KEK\_ID_i$ and a fetch request from the DCD 102, fetches $KEK_i$ from the non-volatile memory 140, and returns $KEK_i$ to the DCD 102. The fetch operation corresponds to the RetrieveKey RequestCode in FIG. 3B.
      (iii) Delete. The delete operation allows $KEK_i$ to be deleted from the non-volatile memory 140. The KEK operation dispatcher 159 receives $KEK\_ID_i$ and a delete request from the DCD 102, instructs the KEK manager 138 to delete $KEK_i$ from the non-volatile memory 140, receives confirmation from the KEK manager 138 that $KEK_i$ has been deleted, and confirms to the DCD 102 that deletion has occurred. The delete operation corresponds to the DeleteKey RequestCode in FIG. 3B.
      (iv) Update. The update operation is performed during key restoration. The KEK operation dispatcher 159 receives a new $KEK_i$ for a KEK_ID from the DCD 102, sends an update request with $KEK_i$ and KEK_ID to the KEK manager 138, receives confirmation from the KEK manager 138 that the new KEK_ID has been associated with $KEK_i$, and relays this confirmation to the DCD 102. The update operation corresponds to the UpdateKey RequestCode in FIG. 3B.
   (d) Wireless channel manager 161. The wireless channel manager 161 manages RF communication between the DCD 102 and KVD 104.
   (e) Pairing logic 163. The pairing logic comprises statements and instructions to implement the pairing protocol as described in respect of FIG. 3A, above.
   (f) DCD health agent 151. The DCD health agent 151 communicates with the analogous KVD health agent 150 comprising part of the DCD 102 to receive updates on the DCD 102's status, and sends these status updates to the KVD system monitor agent 167. The DCD health agent 151 also receives updates on the KVD 104's health from the intelligent agent 173 and relays these updates to the KVD health agent 150 on the DCD 102. Health updates comprise information such as the status $S_i$ of each of the DCD 102 and KVD 104, as determined using the exemplary methods of FIGS. 8 to 12.
3. KVD system monitor agent 167. The KVD system monitor agent 167 gathers information about the current states of the DCD 102 and KVD 104 by, for example:
   (a) receiving information from the KVD 104's sensors, such as whether a WiFi signal is available, current location as determined via a GPS sensor, and the KVD 104's orientation as determined using a gyroscope or accelerometer;
   (b) receiving information from the KVSM 134 via the KVSM connection manager 181 regarding, for example, the health state of the KVD 104, the DCD 102, or both;
   (c) receiving information from the DCD health agent 151 on the status of the DCD 102;
   (d) aggregating the information collected in subparagraphs (a)-(c) and sending the aggregated information to the intelligent agent 173 and the KVSM connection manager 181 for more detailed analysis.
4. Intelligent agent 173. The intelligent agent 173 analyzes the health state of the KVD 104. The intelligent agent
   (a) receives information from the KVD system monitor agent 167;
   (b) stores security policy and rules as the security policy and rules 171;
   (c) determines the current state of the KVD 104; and
   (d) sends instructions to the wipe/fade manager 171 to wipe or fade KEKs based on the current state of the KVD 104. If after time $t_i$ the KVD 104 remains in state $S_i$, the intelligent agent 173 instructs the wipe/fade manager 171 to delete the KEKs having priority $p_j \ldots p_i$. State $S_0$ is considered a safe state in which data is stored indefinitely.

Based on the security policy and rules 171, the intelligent agent 173 assigns the KEKs stored in the non-volatile memory 140 a priority level selected from $p_1, p_2, \ldots p_m$. These priority levels are sent to the DCD 102 either directly via the wireless connection 110 or indirectly via the KVSM 134. Level $p_1$ represents the most confidential or sensitive data while level $p_n$ represents the least confidential or sensitive data. The security policy and rules 171 may be loaded on to the KVD 104 in any one of a variety of suitable ways, such as by being pushed by the KVSM 134 or created by the intelligent agent 173 after monitoring operation of the KVD 104.

The intelligent agent 173 has states $S_1, S_2, \ldots S_n$, which correspond respectively to priority levels $p_1, p_2, \ldots p_n$. The intelligent agent 173 has access to input from the KVD system monitor agent 167 and the KVSM 134 and to the security policy and rules 171 and from these determines whether to wipe the KEKs from the KVD 104 to prevent them from being surreptitiously accessed. The intelligent agent 173 uses artificial intelligence or machine learning methods to determine the health status of the KVD 104. The intelligent agent 173 uses active learning to interactively obtain data from the KVD system monitor agent 167 to make decisions about the state of the KVD 104. The intelligent agent 173 then uses any suitable classification method such as Bayesian networks, Markov networks, decision trees, support vector machines, or neural networks on the data that the KVD system monitor agent 167 outputs to learn and periodically update the model used to determine the health status of the KVD 104. Inference methods can be run on these models to determine the probability of the KVD 104 being in different states.

5. Wipe/fade manager 171. The wipe/fade manager 171 instructs the KEK manager 138 to delete KEKs in response to instructions from the KVSM connection manager 181 or the intelligent agent 173. Regardless of the source of the instructions, the wipe/fade manager 171 receives a command to wipe/fade $KEK\_ID_i$, which it relays to the KEK manager 138.

6. Backup/restore agent 165. The backup/restore agent 165 is used to backup to or restore keys from cloud storage; that is, to back up to or restore keys from the KVSM 134. To backup keys, the backup/restore agent 165 receives a backup request from the KEK manager 138, which comprises $KEK_i$, $KEK\_ID_i$, and k. The backup/restore agent 165 then sends $KEK_i$, $KEK\_ID_i$, and k to the KVSM connection manager 181 for transmission to and storage in the KVSM 134. To restore keys, an exemplary method such as that described below in respect of FIG. 14 is performed.

7. KVSM connection manager 181. The KVSM connection manager 181 is responsible for securely communicating with the KVSM 134. The KVSM connection manager comprises the following modules:

(a) Link certificate manager 177. The link certificate manager 177 performs authentication logic as described above in respect of steps 1 through 3 of FIG. 3A, except that instead of authenticating the DCD 102 and KVD 104, the link certificate manager 177 authenticates the KVD 104 and KVSM 134, respectively.

(b) Session key manager 179. The session key manager 179 generates the S3K using the ECDH protocol as described above in respect of steps 4 through 7 of FIG. 3A, except that instead of the DCD 102 and KVD 104 generating the S3K, the KVD 104 and KVSM 134 generate the S3K, respectively.

(c) Wireless channel manager 175. The wireless channel manager 175 manages RF communication between the KVD 104 and KVSM 134.

Figure 6:
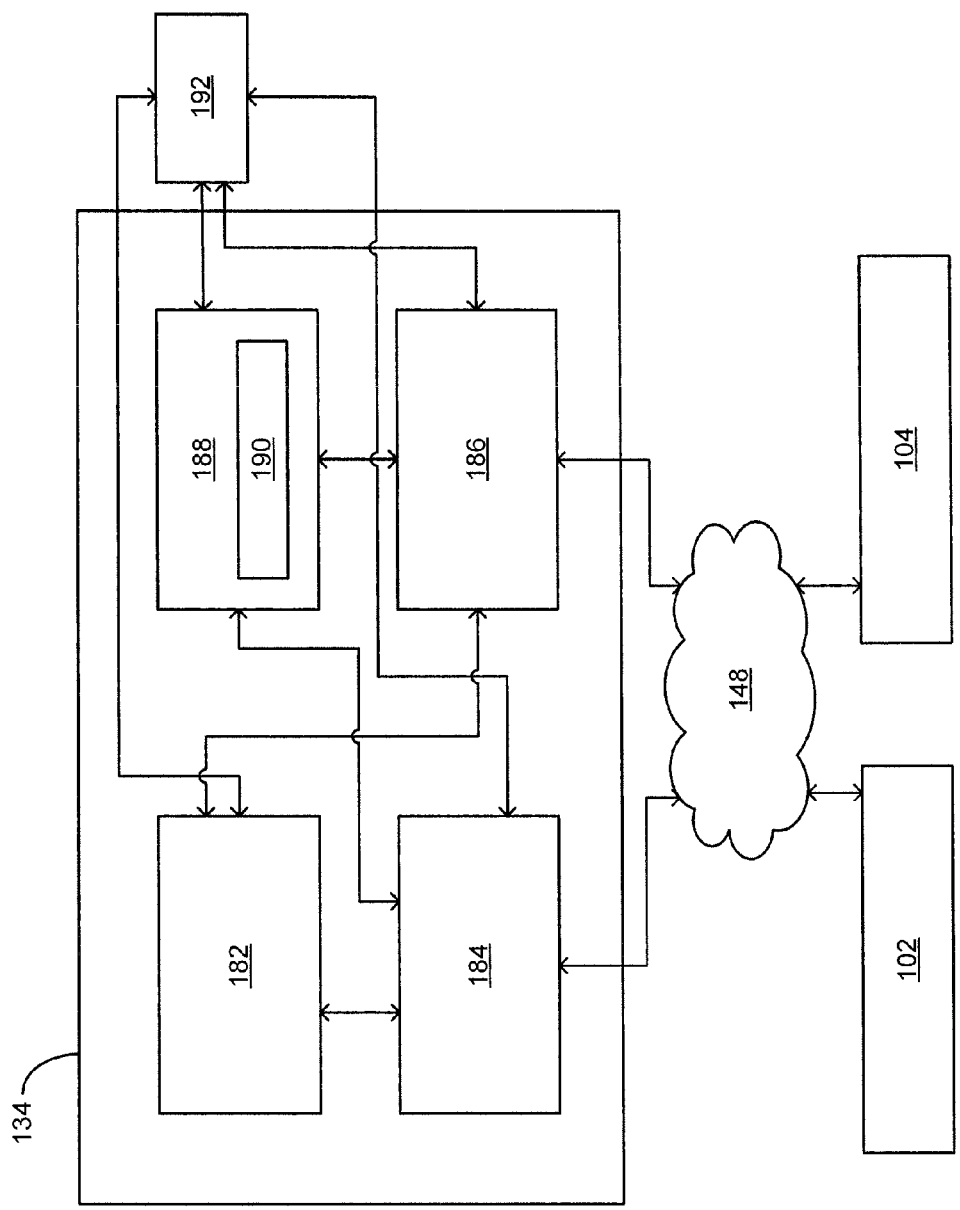
FIG. 6 shows a block diagram of a key vault system manager, which also comprises part of the system for decoupling user authentication and data encryption.

Referring now to FIG. 6, there is shown a block diagram of the KVSM 134, according to one embodiment. The KVSM 134 comprises an intelligent agent 182, a DCD connection manager 184, a KVD connection manager, and a backup/restore manager 188 that itself comprises storage 190 such as a non-transitory computer readable medium. Each of these four modules is communicative with a system administration unit 192. Each of the backup/restore manager 188 and the intelligent agent 182 is also communicative with the DCD and KVD connection managers 184,186. The DCD connection manager 184 is also communicative with the DCD 102 while the KVD connection manager 186 is also communicative with the KVD 104 via the network 148.

The DCD connection manager 184 is responsible for securely and wirelessly communicating with the DCD 102, while the KVD connection manager 186 is responsible for securely and wirelessly communicating with the KVD 104. The DCD and KVD connection managers 184,186 may communicate using any suitable method for communicating between a mobile device, such as the DCD 102 and KVD 104, and a web service. The backup/restore manager 188 accepts KEKs from the DCD 102, the KVD 104, or both and backs them up to the storage 190, and similarly is able to push KEKs to the DCD 102, KVD 104, or both. An administrator, via the system administration unit 192, can also push data such as documents to one or both of the DCD 102 and KVD 104 via the backup/restore manager 188. The intelligent agent 182 receives status reports from the DCD 102 and the KVD 104 on, for example, their current state $S_i$.

The KVSM 134 performs the following functions:

1. the backup/restore manager 188 backs up and restores KEKs from the DCD 102 or KVD 104;
2. relay commands, which may originate from the system administration unit 192, such as to wipe all or some of the KEKs stored on the DCD 102, KVD 104, or both;
3. relay commands, which may originate from the system administration unit 192, to modify the status of the DCD 102, KVD 104, or both, which may be done when the KVSM 134 learns the DCD 102, KVD 104 or both have been compromised;
4. push data, such as documents, to the DCD 102, which optionally originate from the system administration unit 192;
5. allow the system administrator to communicate with the DCD 102 and KVD 104 via their connection managers 184,186;
6. allow the DCD 102 and KVD 104 to communicate with each other via the KVSM 134 when the wireless connection 110 is unavailable (e.g.: when the DCD 102 and KVD 104 are too far apart to communicate using the wireless connection 110);
7. receive and analyze reports from the KVD and DCD health agents 150,151 using the KVSM 134's intelligent agent analyzer 182; and
8. request updates on the status of one or both of the DCD 102 and KVD 104.

To delete data, EKs, or KEK_IDs from one or both of the DCD 102 and KVD 104, the intelligent agent 182 on the KVSM 134 may send wipe commands to one or both of the DCD 102 and KVD 104. Alternatively, the intelligent agent 172 on the DCD 102 may independently determine, from the status of the DCD 102, that it should attend to wiping all data, EKs, and KEK_IDs from the DCD 102. Additionally or alternatively, the intelligent agent 173 on the KVD 103 may independently determine, from the status of the KVD 103, that it should attend to wiping all KEKs and KEK_IDs from the KVD 104. For example, in one embodiment if the DCD 102 is unable to communicate with the KVSM 134 and the intelligent agent 172 on the DCD 102 determines that the DCD 102 has been compromised, the intelligent agent 172 instructs the framework manager 118 and KVD connection manager 120 to delete each EK and $E_{KEK}(EK)$. Similarly, in one embodiment if the KVD 104 is unable to communicate with the KVSM 134 and the intelligent agent 173 on the KVD 102 determines that the KVD 104 has been compromised, the intelligent agent 173 instructs the KEK manager 134 to delete all KEKs and KEK_IDs. If the DCD 102 and KVD 104 are able to communicate with the KVSM 134, then in one exemplary embodiment the DCD 102 and KVD 104 only wipe information in response to an instruction from the KVSM 134. Further examples of operation are described below in respect of FIGS. 8 to 12.

In each of FIGS. 8 to 12, the system 100 has three states $S_0$, $S_1$, and $S_2$ and data having priority $p_1$ and $p_2$. In state $S_1$, $t_1$ is set to 0 seconds, while in state $S_2$ $t_2$ is set to 0 seconds; that is, all data having priority $p_1$ are immediately deleted when the system 100 is placed in state $S_1$ and all data having priority $p_1$ and $p_2$ are immediately deleted when the system 100 is placed in state $S_2$. In state $S_0$ the system 100 retains all data indefinitely.

Figure 8:
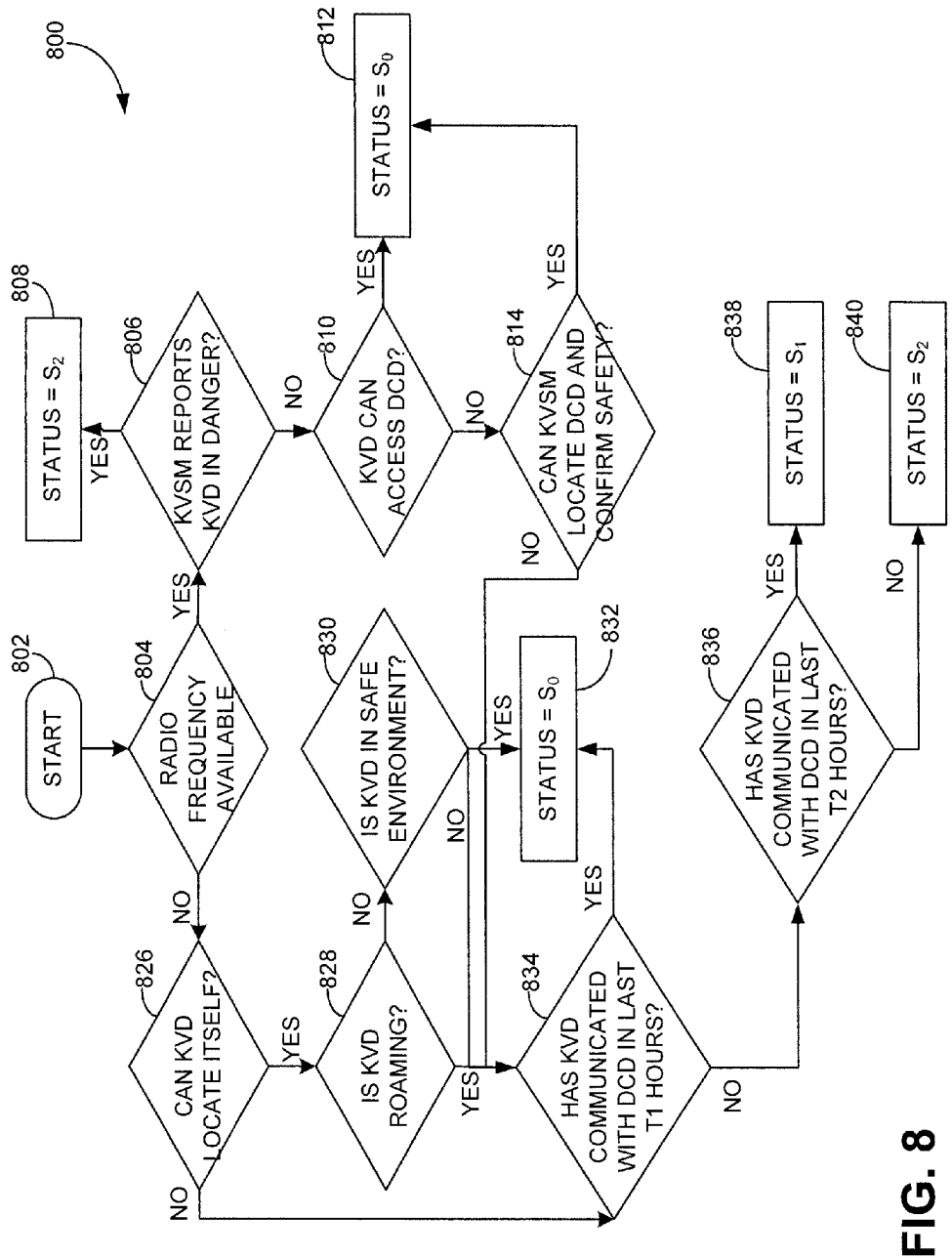
FIGS. 8, 9, 10, 11A, 11B, and 12 show methods the data container device, the key vault device, and the key vault system manager employ to assess a threat status, according to additional embodiments.

Referring now to FIG. 8, there is shown a method 800 that the KVD 104 performs when determining its own status, according to one embodiment. The KVD 104 begins at block 802 and proceeds to block 804 where the wireless channel manager 175 determines whether wireless communication via radio frequency (e.g. such as by using cellular towers) is possible with the KVSM 134. If no communication with the KVSM 134 is possible, the KVD 104 proceeds to block 826 where the KVD system monitor agent 167 attempts to determine the KVD 104's location using, for example, a GPS receiver or WiFi receiver. If the KVD system monitor agent 167 can successfully locate the KVD 104, the KVD 104 proceeds to block 828 where the intelligent agent 173 determines whether the KVD 104 is roaming. In this embodiment, the security policy and rules 171 define a home jurisdiction (e.g.: San Francisco Bay Area) for the KVD 104. When the KVD 104 is within the home jurisdiction the intelligent agent 173 classifies it as not roaming and proceeds to block 830. At block 830, the intelligent agent 173 determines whether the KVD 104 is not only in the home jurisdiction, but is in what is considered a safe environment. For example, if the home jurisdiction is the San Francisco Bay Area, the safe environment may be a particular office complex in San Francisco proper. If the intelligent agent 173 determines that the KVD 104 is in the safe environment, then it proceeds to block 832 and sets the KVD 104's status to $S_0$. If the intelligent agent 173 determines that the KVD 104 is outside the safe environment or is roaming, the KVD 104 proceeds to block 834. At block 834 the intelligent agent 173 determines whether the KVD 104 has communicated with the DCD 102 within the last T1 hours and if the communication did not indicate that the KVD 104 had been compromised. If yes, the intelligent agent 173 proceeds to block 832 and sets the KVD 104's status to $S_0$. If no, the intelligent agent 173 proceeds to block 836 and determines whether the KVD 104 has communicated with the DCD 102 within the last T2 hours, where T2>T1. If yes, the intelligent agent 173 proceeds to block 838 and sets the KVD 104's status to $S_1$. If no, the intelligent agent 173 proceeds to block 840 and sets the KVD 104's status to $S_2$.

If the KVD 104 can communicate with the KVSM 134, then instead of proceeding to block 826 from block 804 the KVD 104 proceeds to block 806. At block 806, the KVSM connection manager 181 queries the KVSM 134 to determine whether the KVSM 134 has determined that the KVD 104 is in danger. For example, the KVD 104's owner may have reported that the KVD 104 has been stolen, which would result in the KVSM 134 telling the KVSM connection manager 181 that the KVD 104 is in danger. If the KVD 104 is in danger, the intelligent agent 173 proceeds to block 808 and sets the KVD 104's status to $S_2$. If the KVD 104 is not in danger, the KVD 104 proceeds to block 810 and attempts, via the DCD connection manager 136, to communicate with the DCD 102 and confirm its safety. If communication is possible, the intelligent agent 173 proceeds to block 812 and sets the KVD 104's status to $S_0$. If communication is not possible, the KVD 104 proceeds to block 814 and asks the KVSM 134 whether it can locate the DCD 102. If the KVSM 134 cannot locate the DCD 102, the KVD 104 proceeds to block 834 where it determines whether it has communicated with the DCD 102 within the last T1 hours. If yes, the KVD 104 proceeds to block 832 and its status is set to $S_0$. If no, the KVD 104 proceeds to block 836 where it determines whether it has communicated with the DCD 102 within the last T2 hours, where T2>T1. If yes, the KVD 104 proceeds to block 832 and sets its status to $S_0$. If no, the KVD 104 proceeds to block 836 and determines whether it has communicated with the DCD 102 within the last T2 hours, where T2>T1. If yes, the KVD proceeds to block 838 and sets its status to $S_1$. If no, the KVD 104 proceeds to block 840 and sets its status to $S_2$.

Figure 9:
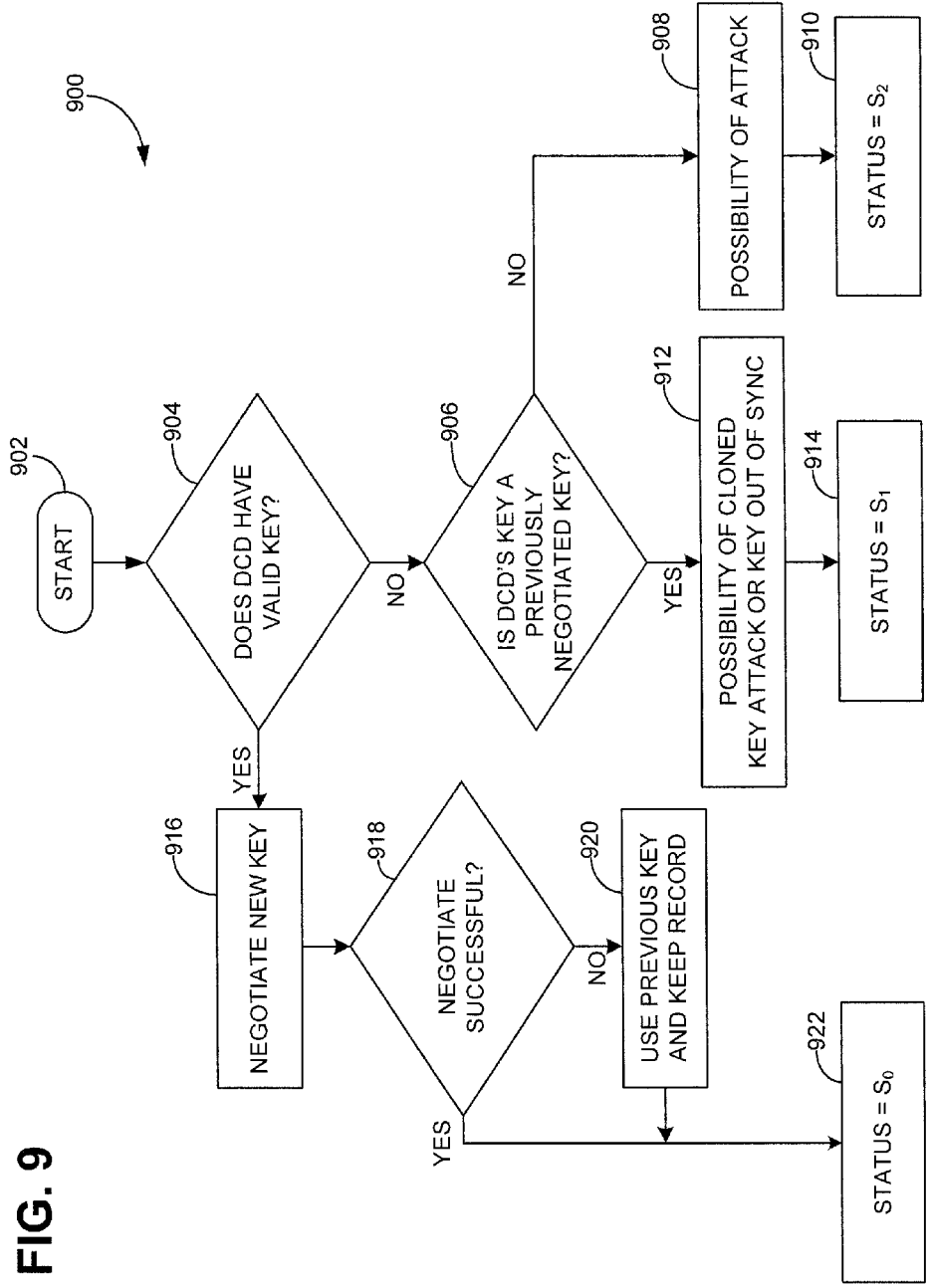

Referring now to FIG. 9, there is shown a method 900 that the KVD 104 performs when determining its own status, according to another embodiment. The KVD 104 performs the method 900 of FIG. 9 when the DCD 102 requests one of the KEKs.

The KVD 104 begins performing the method 900 at block 902 and proceeds to block 904 where the session key manager 157 on the KVD 104 determines whether the S3K the DCD 102 is valid. If the S3K is not valid, the KVD 104 proceeds to block 906 where the session key manager 157 determines whether the DCD 102 is using a previously negotiated S3K. If no, then the intelligent agent 173 on the DCD 102 determines that there is a possibility that an adversary is attempting to surreptitiously gain access to the KEKs stored on the KVD 104 at block 908 and sets the status of the KVD 104 to $S_2$ at block 910. If the DCD 102 is attempting to communicate using a previously negotiated S3K, then at block 912 the intelligent agent 173 determines that an adversary may be attempting to surreptitiously gain access to the KEKs using a cloned S3K, or that the S3Ks being used by the DCD 102 and KVD 104 are not synchronized. In this case, the intelligent agent 173 sets the status of the KVD 104 to $S_1$ at block 914.

If the DCD 102 is attempting to communicate with a valid S3K, the KVD 104 proceeds from block 904 to block 916 where the session key manager 157 negotiates a new S3K with the DCD 102. The session key manager 157 determines whether negotiation of the new S3K is successful at block 918. If yes, the KVD 104 proceeds to block 922 and the intelligent agent 173 sets the status of the KVD 104 to S3. If not, at block 920 the session key manager 157 allows communication to proceed with the S3K examined at block 904, but records the inability to negotiate a new S3K for future reference. The KVD 104 subsequently proceeds to block 922 where the intelligent agent 173 sets the KVD 104's status to $S_0$.

Figure 10:
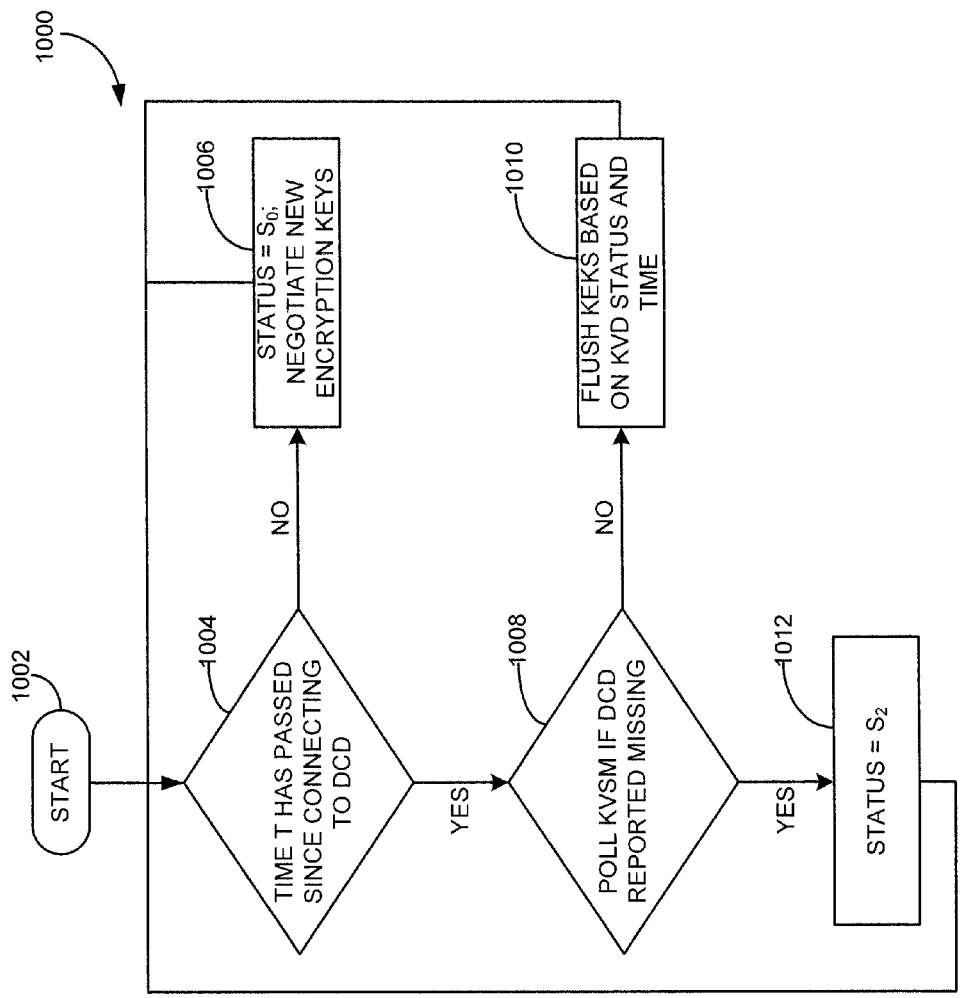

Referring now to FIG. 10, there is shown a method 1000 repeatedly performed by the KVD 104 to determine its own status regardless of whether the DCD 102 is actively requesting KEKs. The method 1002 begins at block 1002, following which the KVD 104 proceeds to block 1004 where the intelligent agent 173 determines whether time T has passed since it last connected to the DCD 102 and negotiated a new S3K. If time T has not passed, the KVD 104 proceeds to block 1006 where the intelligent agent 173 sets the KVD 104's status to $S_0$ and the session key manager 157 negotiates a new S3K with the DCD 102. In the method 1000 of FIG. 10, it is assumed that any attempt made by the DCD 102 to negotiate a new S3K is successful; in alternative embodiments (not shown), however, the method 1000 may be modified to take into account unsuccessful S3K negotiations. After a new S3K is negotiated the KVD 104 returns to block 1004.

If the KVD 104 is unable to contact the DCD 102 at block 1004 for any reason (e.g.: the KVD 104 may have been moved beyond the range of the wireless connection 110), the KVD 104 proceeds to block 1008 where the KVSM connection manager 181 queries the KVSM 134 to determine if the DCD 102 has reported missing. If no, the KVD 104 proceeds to block 1010 where the data wipe and fade manager 169 is instructed to delete KEKs based on their priority level, the status of the KVD 104, and elapsed time. After the data wipe and fade manager 169 is instructed the KVD 104 returns to block 1004. If, however, the DCD 102 has been reported missing to the KVSM 134, then the KVD 104 proceeds from block 1008 to block 1012 where all the KEKs are immediately deleted and the status of the KVD 104 is set to $S_2$.

Figure 11A:
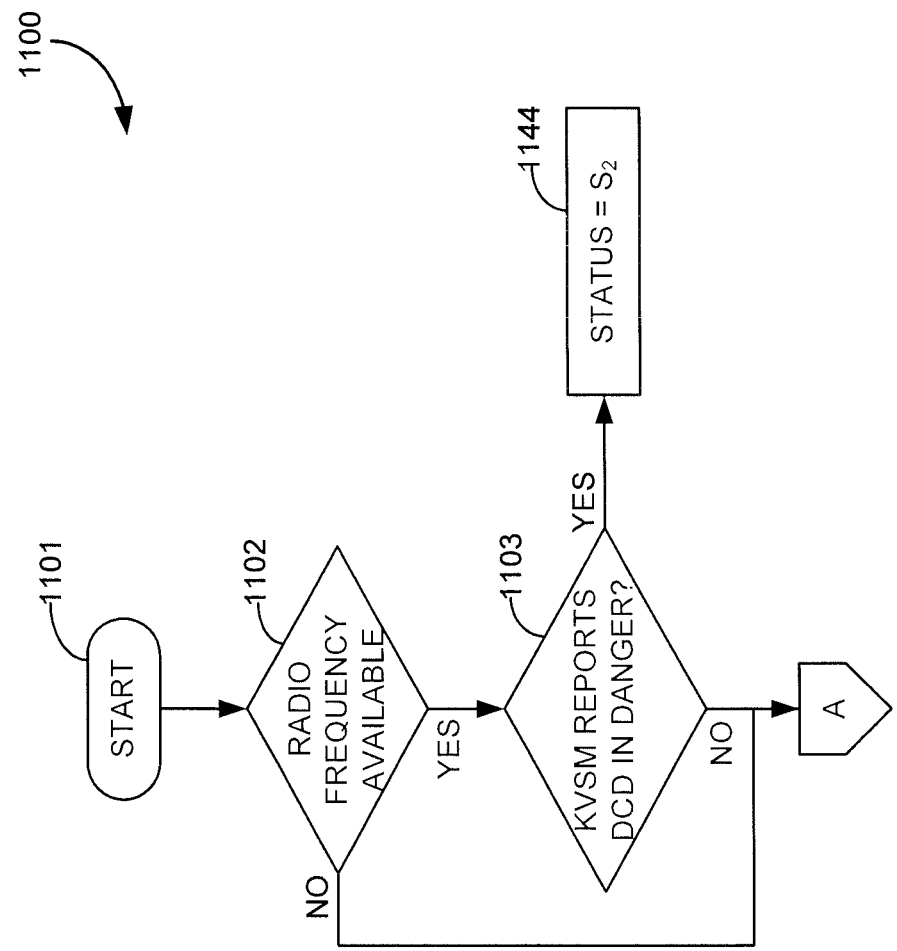
Figure 11B:
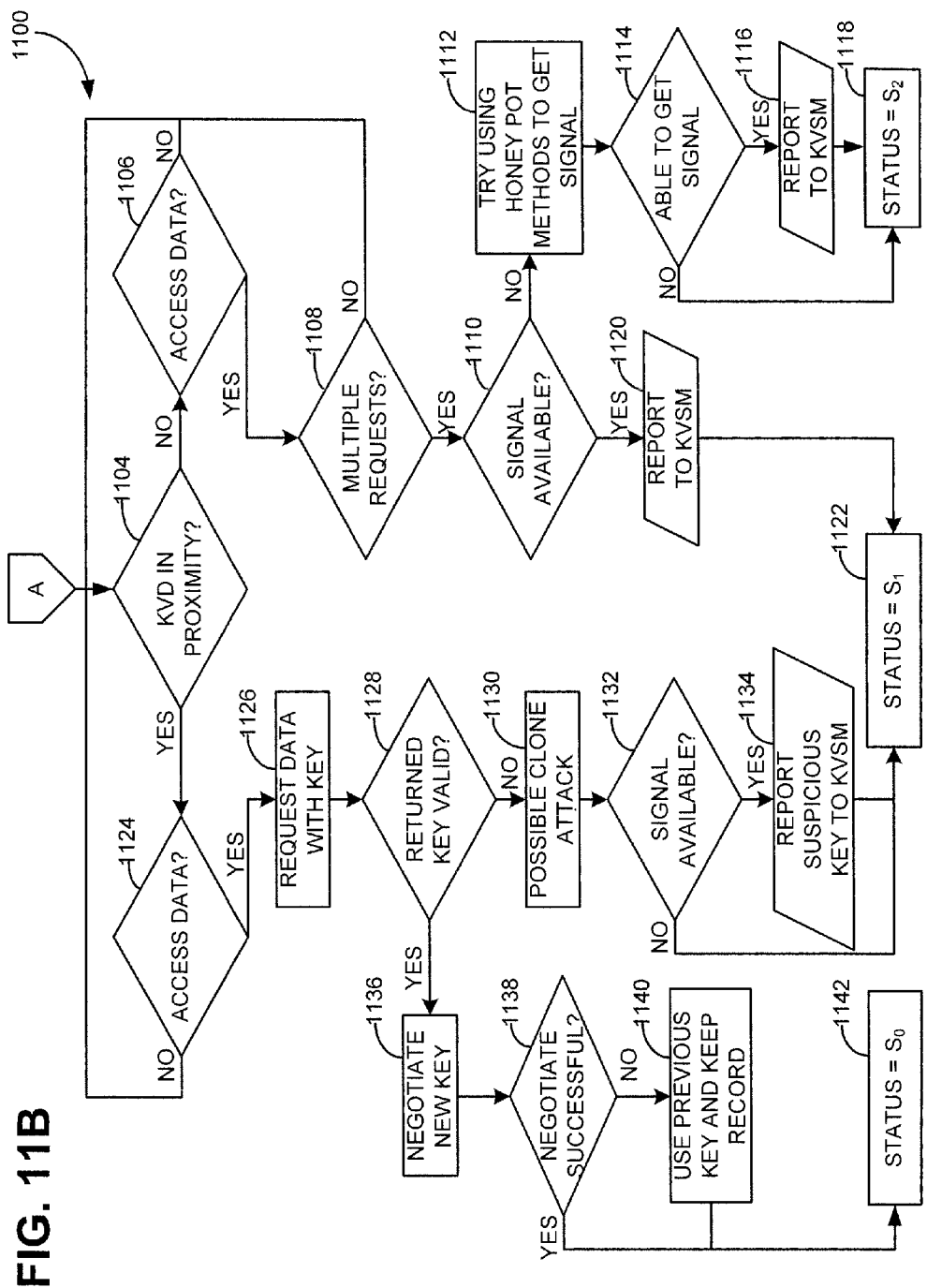

Referring now to FIGS. 11A and 11B, there is shown a method 1100 that the DCD 102 applies when determining its status, according to another embodiment. The DCD 102 begins performing the method 1100 at block 1101 and proceeds to block 1102 where the wireless channel manager 160 in the KVD connection manager 120 determines whether a radio frequency is available to communicate with the KVSM 134. If communication is possible, the DCD 102 proceeds to block 1103 where it determines whether the KVSM 134 reports that the DCD 102 is currently in danger. If yes, the DCD 102 proceeds to block 1144 and the intelligent agent 172 sets the DCD 102's status to $S_2$. If not, or if communication with the KVSM 134 is not possible, the DCD 102 proceeds to block 1104 where the wireless channel manager 160 in the KVD connection manager 120 determines whether the KVD 104 is within range of the wireless communication channel 110. If no, the DCD 102 proceeds to block 1106 where the intelligent agent 172 determines whether it needs to access data in the form of a KEK from the KVD 104. If no, the DCD 102 returns to block 1104. If yes, the DCD 102 proceeds to block 1108 where it determines whether it has already tried multiple times to contact the KVD 104. If no, the DCD 102 returns to block 1104. If yes, the DCD 102 proceeds to block 1110 where the wireless channel manager 174 in the KVSM connection manager 180 determines whether a wireless signal is available to communicate with the KVSM 134. If no, the KVD connection manager tries using honey pot methods to obtain this wireless signal to, for example, trick the adversary into turning on the wireless signal (e.g. by tricking the adversary into thinking he has access to the operator's bank account). At block 1114 the intelligent agent 172 determines whether the wireless connection manager 174 was able to establish contact with the KVSM 134. If yes, it reports the fact that it has tried and failed multiple times to obtain the KEK from the KVD 104 and proceeds to block 1118 where it sets the DCD 102's status to $S_2$. If no, the KVD 104 proceeds directly to block 1118 from block 1114. If at block 1110 the wireless channel manager 160 is able to obtain signal, the DCD 102 similarly reports its failure to obtain data from the KVD 104 to the KVSM 134 at block 1120 and proceeds to block 1122 where the DCD 102's status is set to $S_1$.

If at block 1104 the wireless channel manager 160 determines the KVD 104 and DCD 102 are within range of each other, the DCD 102 proceeds to block 1124 where the framework manager 118 determines whether it needs to access data in the form of a KEK from the KVD 104. If no, the DCD 102 returns to block 1104. If yes, the DCD 102 proceeds to block 1126 where the session key manager 156 requests a new S3K along with a KEK from the KVD 104. The session key manager 156 determines whether the S3K the KVD 104 returns is valid at block 1128. If not, the intelligent agent 172 concludes at block 1130 that a possible attack using a clone of an S3K is taking place, and uses the wireless channel manager 174 to determine at block 1132 if the KVSM connection manager 180 can communicate with the KVSM 134. If yes, the KVSM connection manager 180 reports the suspicious activity to the KVSM 134 at block 1134 and the DCD 102 proceeds to block 1122 where its status is set to $S_1$. If the KVSM 134 is unable to communicate with the KVSM connection manager 180, the DCD 102 proceeds directly to block 1122 from block 1132.

If the session key manager 156 determines that the S3K the KVD 104 returns is valid at block 1128, it proceeds to block 1136 where it negotiates a new S3K. It determines at block 1138 whether this negotiation is successful. If yes, the DCD 102 proceeds directly to block 1142 where its status is set to $S_0$. If not, the session key manager 156 uses the S3K considered at block 1128, stores the fact that a new S3K has not been obtained, and then proceeds to block 1142.

Figure 12:
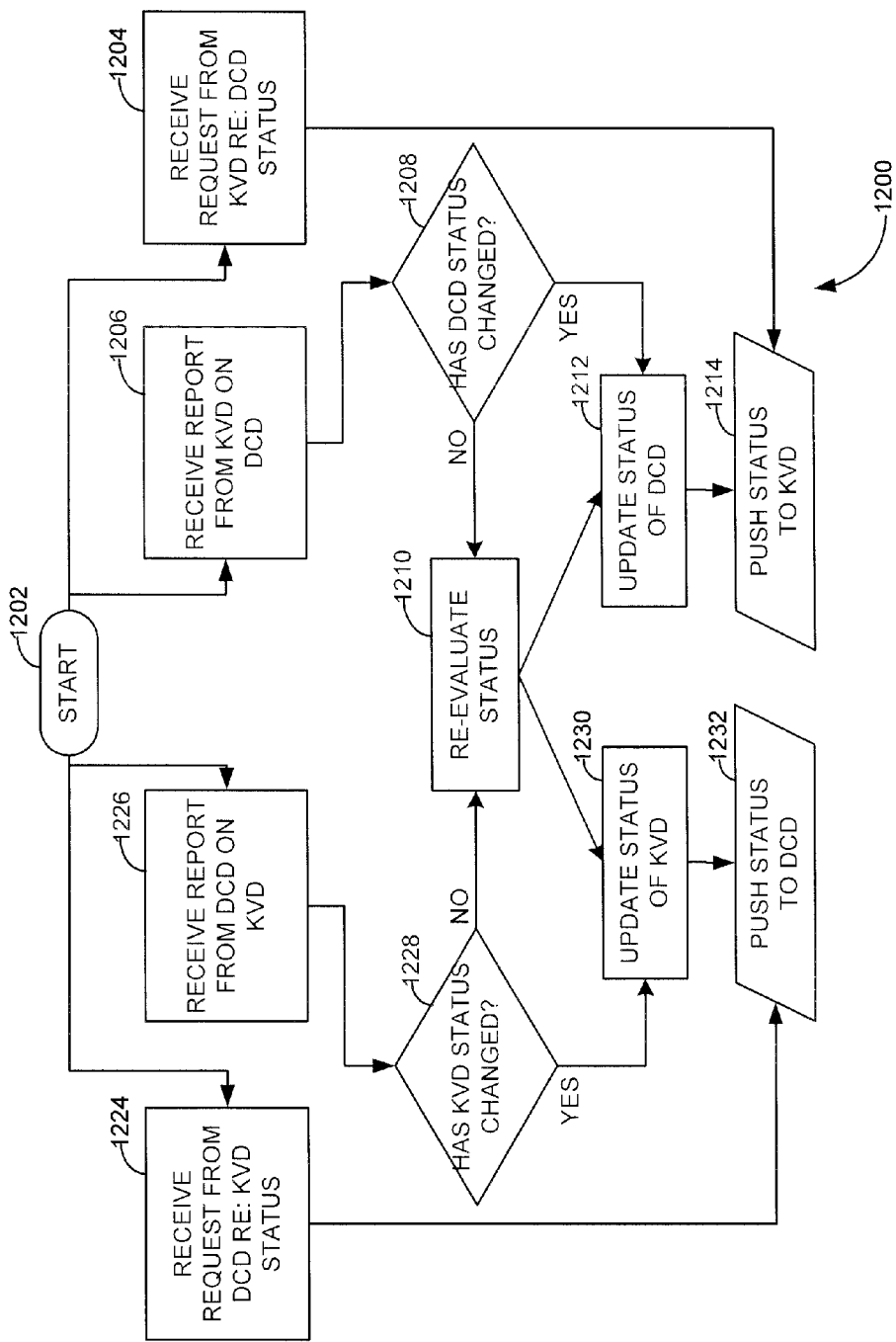

Referring now to FIG. 12, there is shown a method 1200 that the KVSM 134 applies when determining the status of one or both of the DCD 102 and KVD 104, according to another embodiment. The KVSM 134 begins performing the method at block 1202 and the KVSM 134's intelligent agent 182 performs one of four tasks: it receives a report on the status of the KVD 104 from the DCD 102 (block 1226), it receives a request from the DCD 102 about the status of the KVD 104 (block 1224), it receives a request from the KVD 104 about the status of the DCD 102 (block 1204), or it receives a report on the status of the DCD 102 from the KVD 104 (block 1206). If the intelligent agent 182 receives a report from the DCD 102 on the KVD 104 at block 1226, it proceeds to block 1228 where it determines whether the report included information on the status of the KVD 104 changing. If the status of the KVD 104 hasn't changed the intelligent agent 182 proceeds to block 1210 where it evaluates the status of the KVD 104 based on the information contained in the DCD 102's report. For example, the DCD 102's report may include information that the KVD 104 is now located 100 miles away from a pre-determined safe environment and that communication with the KVD 104 has been interrupted several times. Based on this information, the intelligent agent 182 at block 1210 may decide to alter the status of the KVD 104; for example, if the DCD 102's report contained suspicious activity, it may set the status of the KVD 104 to $S_2$. Once the intelligent agent 182 determines the status of the KVD 104, it proceeds to block 1230 where the KVSM 134 stores the status of the KVD 104, and then to block 1232 where it pushes this status to the DCD 102.

The intelligent agent 182 performs an analogous process if it receives a report from the KVD 104 on the DCD 102 at block 1206. It proceeds to block 1208 where it determines whether the report included information on the status of the DCD 102 changing. If the status of the DCD 102 hasn't changed the intelligent agent 182 proceeds to block 1210 where it evaluates the status of the DCD 102 based on the information contained in the KVD 104's report. For example, the KVD 104's report may include information that the DCD 102 is now located 100 miles away from a pre-determined safe environment and that communication with the DCD 102 has been interrupted several times. Based on this information, the intelligent agent 182 at block 1210 may decide to alter the status of the DCD 102; for example, if the KVD 104's report contained suspicious activity, it may set the status of the DCD 102 to $S_2$. Once the intelligent agent 182 determines the status of the DCD 102, it proceeds to block 1212 where the KVSM 134 stores the status of the DCD 102, and then to block 1214 where it pushes this status to the KVD 104.

If the intelligent agent 182 receives a request from the DCD 102 regarding the KVD 104's status at block 1224, the intelligent agent 182 proceeds directly to block 1232 where the KVSM 134 pushes to the DCD 102 the current status of the KVD 104 that the KVSM 134 has stored. Analogously, if the intelligent agent 182 receives a request from the KVD 104 regarding the DCD 102's status at block 1204, the intelligent agent 182 proceeds directly to block 1214 where the KVSM 134 pushes to the KVD 104 the current status of the DCD 102 that the KVSM 134 has stored.

In an exemplary situation when the DCD 102 is requesting a KEK from the KVD resident component 115 because the DCD wants to decrypt an EK, the DCD 102 and KVD 104 first authenticate each other and negotiate a session key, as shown in FIGS. 3 and 4. Once the devices 102,104 establish a secure session, the DCD connection manager 136 relays the DCD 102's request to the KEK manager 138, which retrieves the corresponding KEK from the non-volatile memory 140 and returns it to the DCD connection manager 136. The DCD connection manager 136 then relays the retrieved KEK to the KVD connection manager 120 of the DCD resident portion 114. As in the DCD resident portion, the non-volatile memory 140 of the KVD resident portion 115 also stores DCD pairing information.

Figure 13:
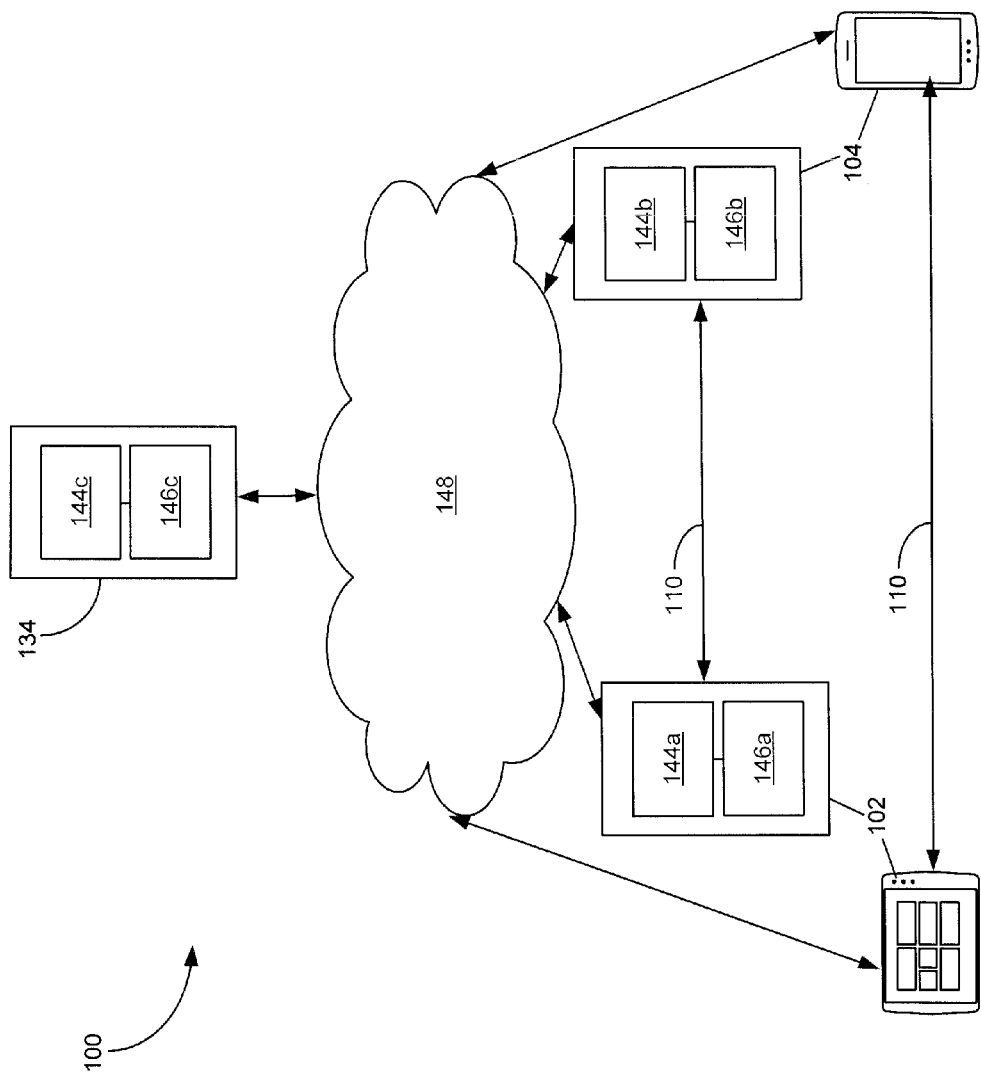

FIG. 13 shows another exemplary embodiment of the system 100. As with the embodiment of FIG. 1, the system 100 of FIG. 13 includes the DCD 102 and KVD 104, which communicate via the wireless communication channel 110 using, for example, the BTLE protocol or a modified version thereof to permit session key establishment. One of the DCDs 102 in FIG. 13 is a tablet, which communicates with one of the KVDs 104, which is a smartphone. More generally, the DCD 102 may be any computing device comprising a controller 144a ("DCD controller 144a") communicative with a non-transitory computer readable medium 146a having encoded thereon statements and instructions to cause the controller 144a to perform the functionality described in any of the embodiments of the DCD 102 described herein. For example, the DCD 102 may be a memory stick that includes the controller 144a and computer readable medium 144b and that communicates using the BTLE protocol. Similarly, the KVD 104 may be any computing device comprising a controller 144b ("KVD controller 144b") communicative with a non-transitory computer readable medium 146b having encoded thereon statements and instructions to cause the controller 144b to perform the functionality described in any of the embodiments of the KVD 104 described herein. An exemplary controller is the Texas Instruments™ CC2540 system on chip based on its 8051 microcontroller.

As in FIG. 1, the DCD 102 and KVD 104 of FIG. 13 are communicative via the network 148 with the KVSM 134. The KVSM 134 may be any computing device comprising a controller 144c ("KVSM controller 144c") communicative with a non-transitory computer readable medium 146c having encoded thereon statements and instructions to cause the controller 144c to perform the functionality described in any of the embodiments of the KVSM 134 described herein, such as a cloud-based server.

All the memory resident on the DCD 102 is referred to as the "DCD memory", all the memory resident on the KVD 104 is referred to as the "KVD memory", and all the memory resident on the KVSM 134 is referred to as the "KVSM memory". For example, the DCD memory includes all volatile and non-volatile memory resident on the DCD 102, such as the volatile memory 124, the non-volatile memory 126, and the computer readable medium 146a, whether accessible by the applications 106, data encryption framework 131, both, or neither. Similarly, the KVD memory includes all volatile and non-volatile memory resident on the KVD 104, such as the non-volatile memory 140 and the computer-readable medium 146b. Similarly, the KVSM memory includes all volatile and non-volatile memory resident on the KVSM 134, such as the computer readable medium 146c.

While FIG. 13 shows both the DCD 102 and KVD 104 being communicative with the KVSM 134, in alternative embodiments (not depicted), the system 100 may not include the KVSM 134, or only one of the DCD 102 and KVD 104 may be communicative with the KVSM 134.

Figure 15:
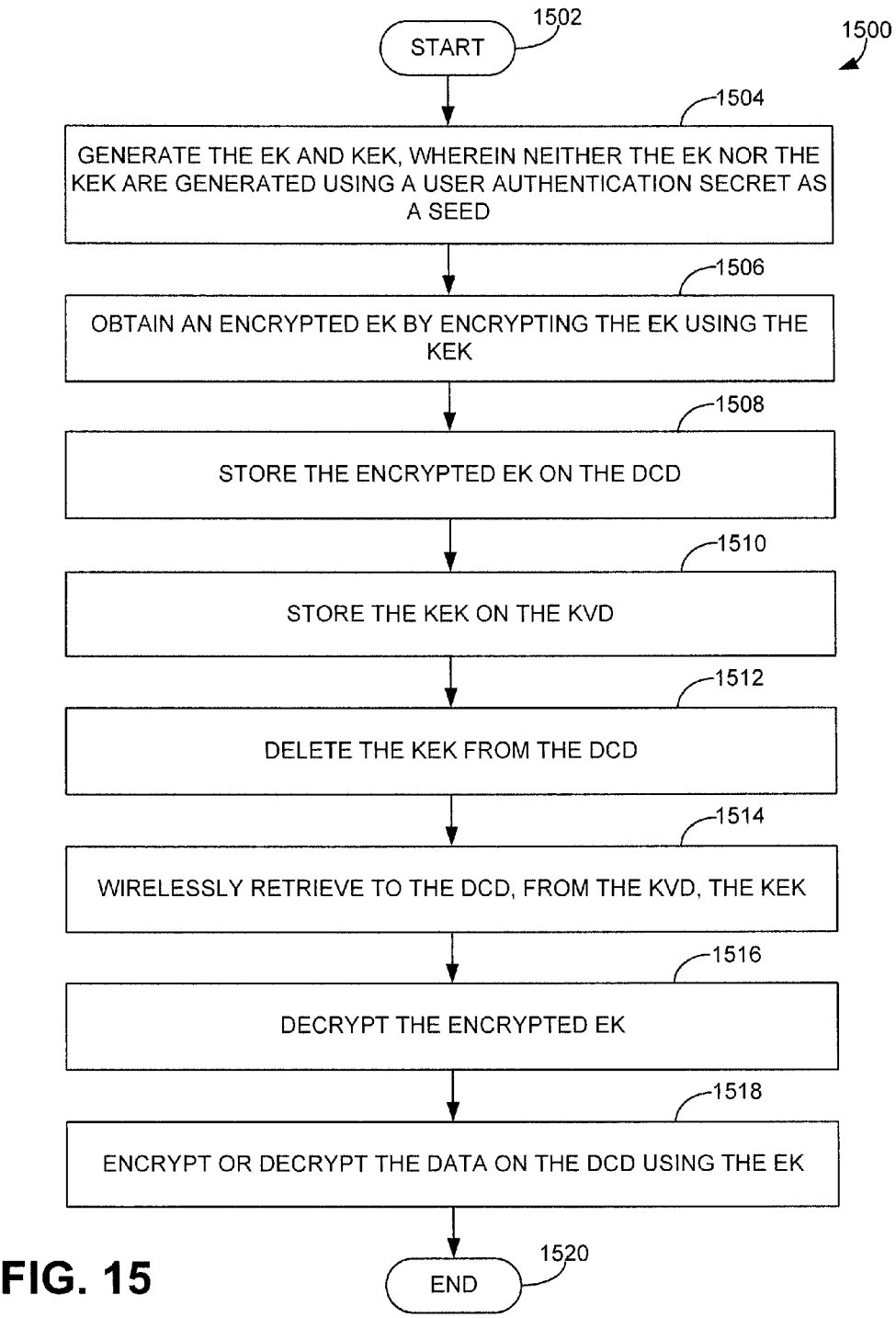
FIG. 15 shows an exemplary method for decoupling user authentication and data encryption, according to another embodiment.

Referring now to FIG. 15, there is shown an exemplary method 1500 for decoupling user authentication and data encryption, according to another embodiment. The method 1500 is performed using the DCD 102 and KVD 104. The method 1500 begins at block 1502 and presumes that the DCD 102 and KVD 104 are already paired and share the same S3K. The method 1500 proceeds to block 1504 where the framework manager 118 generates the EK and KEK, with neither the EK nor the KEK being generated using the user's authentication secret as a seed. The method 1500 proceeds to block 1506 where the framework manager 118 encrypts the EK using the KEK to generated an encrypted EK, and then proceeds to block 1508 where the framework manager 118 stores the encrypted EK in the DCD's non-volatile memory 126. At block 1510 the framework manager 118 pushes the KEK to the KVD 104 via the KEK operation dispatcher 158, following which it deletes the KEK from the volatile memory 124. To subsequently decrypt or encrypt data using the encrypted EK, the framework manager 118 subsequently retrieves the KEK from the KVD in block 1514, decrypts the encrypted EK that is stored in the non-volatile memory 126 at block 1516, and then uses the EK to encrypt or decrypt data, as desired. Once encryption or decryption is performed the EK is optionally deleted or cached in the volatile memory (not shown), and the method 1500 ends at block 1520.

Experimental Results

Two different kinds of experiments were conducted on the system 100, with each experiment being performed using three different scenarios. Scenario 1 modeled protecting authentication credentials, such as passwords, with 400 authentications per day. Scenario 2 modeled encrypting the application 106's folders, with the application 106 launched 1,000 times per day. Scenario 3 modeled data encryption within the application 106, with the data being 10,000 e-mails or pictures.

In one experiment to test latency, the KVD 104 was an Apple™ iPad™ 2 and the DCD 102 was an Apple™ iPhone™ 4S. On the DCD 102, all applications were closed, airplane mode was turned on, Bluetooth™ was enabled, the DCD resident component 114 was enabled, automatic screen brightness adjustment was disabled, and screen brightness was set to maximum. The DCD 102 fetched KEKs n times, while monitoring elapsed time T. $t_{avg}$, the average time to retrieve each KEK, was accordingly equaled T/n.

The DCD 102 fetched a KEK 12,573 times in 21,011 seconds, with $t_{avg}$ equaling 0.96 seconds. For Scenario 1, this translates to 6.67 minutes/day; for Scenario 2, this translates to 16 minutes/day; and for Scenario 3, this translates to 2.67 hours/day. For Scenario 3, one way to decrease latency is to fetch several KEKs per request; i.e., to use a single authorization and ECDH per n KEK reads.

In another experiment designed to test energy consumption by the DCD 102, as a control condition all applications were closed, airplane mode was turned on, automatic screen brightness adjustment was disabled, screen brightness was set to maximum, and the DCD resident component 114 was disabled. The test condition was identical to the control condition except Bluetooth™ was turned on, the DCD resident component 114 was enabled, and the DCD 102 repeated fetched a KEK n times. The DCD 102's approximate power consumption functions $F_{CC}(t)$ (for the control condition) and $F_{TC}(t)$ (for the test condition) were monitored. $F_{CC}(t)$ and $F_{TC}(t)$ are graphed in FIG. 7.

Figure 7:
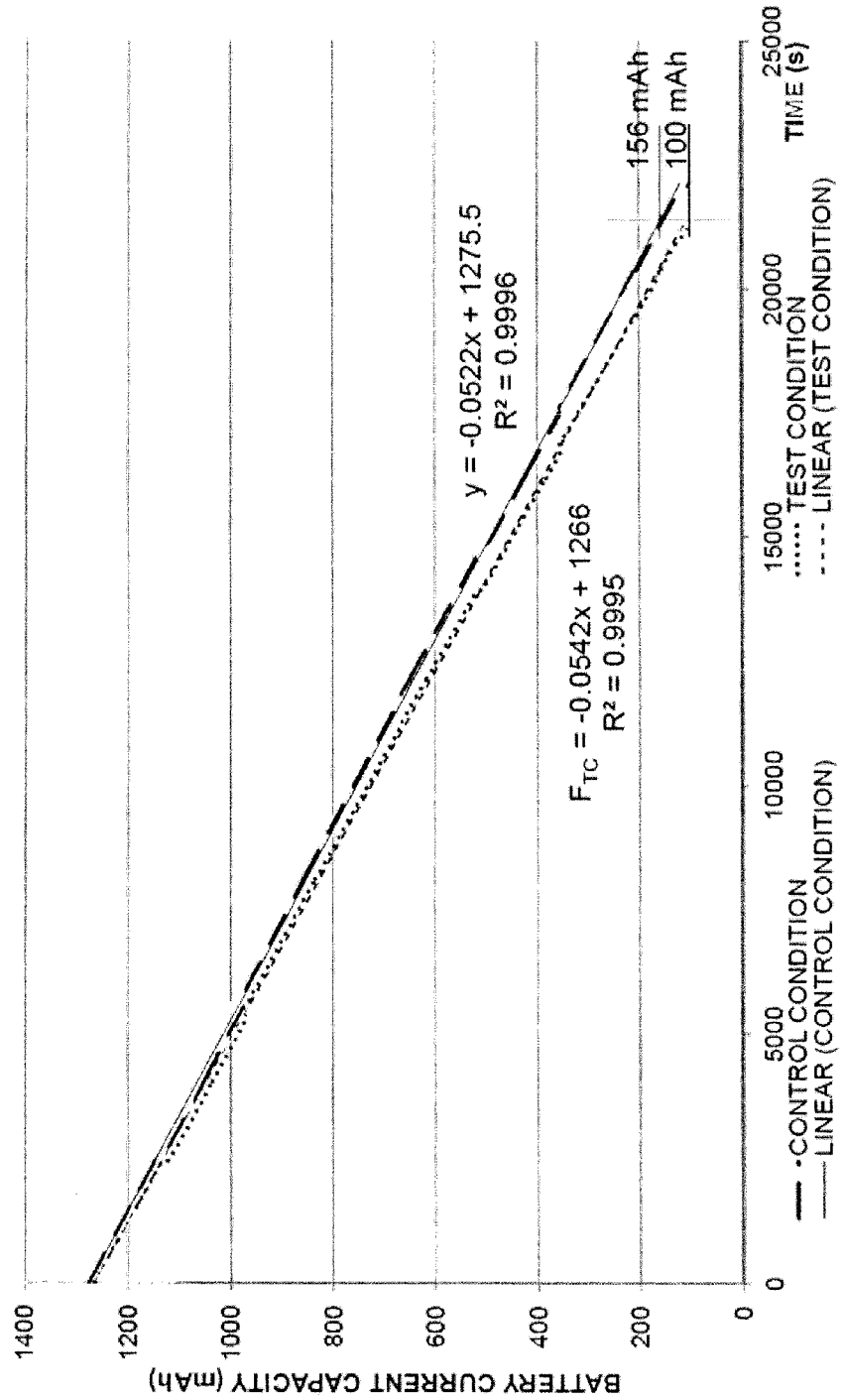
FIG. 7 shows graphs of power consumed by the data container device when the system for decoupling user authentication and data encryption is being employed and when it isn't.

In FIG. 7, the y-intercept is starting battery capacity for the DCD 102 and the slope of the curves is current (in mA) drawn from the battery. The DCD 102 consumed 56 mAh to fetch the KEK 12,573 times; one KEK retrieval operation accordingly consumed 56 mAh/12,573=4.6 µAh, or approximately 0.0003% of maximum battery capacity. For Scenario 1 (400 KEKs), the system 100 would consume 0.12% of the battery's total energy; for Scenario 2 (1,000 KEKs), the system 100 would consume 0.3% of the battery's total energy; and for Scenario 3 (10,000 KEKs), the system 100 would consume 3.0% of the battery's energy. The system 100's power consumption on the DCD 102 is accordingly relatively minimal.

While in the foregoing embodiments symmetric cryptographic keys (e.g. such as those used in AES and DES) are used, in alternative embodiments (not depicted) asymmetric cryptographic keys may be used (e.g. public/private cryptography).

FIG. 14 shows a block diagram 1400 of a key restoration process that may be performed if the KVD 104 is lost. In this embodiment, a public/private key pair is generated when the KVD 104 and DCD 102 are paired; the public key in FIG. 14 is "PUBKEY" and the private key is "PRIVKEY". The private key is printed out, for example as a QR code or stored on a private key storage device 1408 such as a personal computer, USB key, or a server, as shown in FIG. 14. The private key is not stored on the KVD 104 or DCD 102 for security reasons. The public key is stored on the DCD 102 and is used to encrypt the EKs in parallel with the KEKs; thus, the DCD 102 has stored on it $E_{KEK}(EK)$ and $E_{PUBKEY}(EK)$. This is shown as block 1402.

If the KVD 104 is lost or stolen the user may proceed to block 1404, retrieve the private key from the private key storage device 1408, and decrypt all the EKs on the DCD 102. If the private key is stored on a server in an enterprise environment, then an IT department may be required to perform some actions prior to permitting the private key to be retrieved (e.g., call the DCD 102's owner and confirm that she still possesses the DCD 102). In another example, if the private key is printed as a QR code, the DCD 102 will ask the user to present the paper on which the QR code is printed. As an added security precaution, if the KVD 104 is lost or stolen the DCD 102 will also delete all EKs that are encrypted with KEKs, thus leaving decryption of EKs with the private key as the only way to obtain these EKs as described above.

Following retrieval of the private key and decryption of the EKs encrypted using the public key, the user proceeds to block 1406 where the DCD 102 generates new KEKs each of which is referred to as KEK' in FIG. 14, encrypts each EK with a new KEK, and pushes the new KEKs to the KVD 104. Once all the new KEKs are stored on the KVD 104, the state of the DCD 102 reverts back to a non-compromised state and the new KVD 104 is ready to be used instead of the lost KVD 104.

While a controller is used in the foregoing embodiments, in alternative embodiments (not depicted) the controller may instead be, for example, one or more processors, programmable logic controllers, SoCs, field programmable gate arrays, or application-specific integrated circuits. Examples of computer readable media are non-transitory and include disc-based media such as CD-ROMs and DVDs, magnetic media such as hard drives and other forms of magnetic disk storage, and semiconductor based media such as flash media, random access memory, and read only memory.

While each of the DCD controller 144a, KVD controller 144b, and KVSM controller 144c are shown as being individual controllers, in alternative embodiments (not depicted) any one or more of the DCD controller 144a, KVD controller 144b, and KVSM controller 144c may comprise two or more controllers, either networked or operating independently to perform the functionality described above.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

FIGS. 8 to 12 and 15 depict flowcharts of exemplary embodiments of methods. Some of the blocks illustrated in the flowcharts may be performed in an order other than that which is described. Also, it should be appreciated that not all of the blocks described in the flowcharts are required to be performed, that additional blocks may be added, and that some of the illustrated blocks may be substituted with other blocks.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for decoupling user authentication and data encryption on mobile devices, the method comprising:
 (a) generating an encryption key ("EK") for encrypting data and a key encryption key ("KEK") for encrypting the EK, wherein neither the EK nor the KEK are generated using a user authentication secret as a seed;
 (b) obtaining an encrypted EK by encrypting the EK using the KEK;
 (c) storing the encrypted EK on a data container device ("DCD");
 (d) storing the KEK on a key vault device ("KVD") that is distinct from the DCD;
 (e) generating a KEK identifier ("KEK_ID") that identifies the KEK; and
 (f) storing the KEK ID in memory accessible to an application resident on the DCD that accesses the data and on the KVD.

2. The method of claim 1 wherein the DCD generates the KEK, the EK, and the KEK_ID, and further comprising deleting the KEK from the DCD following encrypting the EK.

3. The method of claim 1 wherein the application encrypts or decrypts the data by:
(a) obtaining the EK;
(b) encrypting or decrypting the data using the EK; and
(c) deleting the EK following encryption or decryption.

4. The method of claim 3 wherein obtaining the EK comprises:
(a) sending a request from the application for the EK, wherein the request comprises the KEK_ID;
(b) retrieving, from the KVD, the KEK that the KEK_ID identifies;
(c) decrypting, on the DCD, the EK encrypted using the KEK retrieved from the KVD; and
(d) sending the EK decrypted using the KEK to the application.

5. The method of claim 3 wherein obtaining the EK comprises:
(a) sending a request from the application for the EK, wherein the request comprises the KEK_ID;
(b) determining whether the EK is cached on the DCD; and
(c) when the EK is cached on the DCD, sending the EK that is cached on the DCD to the application.

6. The method of claim 1 further comprising safeguarding the data by deleting one or both of the EK and KEK.

7. The method of claim 1 wherein the DCD comprises a memory stick.

8. The method of claim 1 wherein the EK and KEK expire and further comprising replacing the EK and KEK that expire with a different EK and a different KEK, respectively.

9. The method of claim 1 wherein the KVD and DCD are wirelessly linked.

10. The method of claim 9 wherein the Bluetooth™ Low Energy protocol is used to link the KVD and DCD.

11. The method of claim 9 further comprising:
(a) determining whether the KVD and DCD cease to be wirelessly linked; and
(b) deleting the EK from the DCD when the KVD and DCD cease to be wirelessly linked.

12. The method of claim 9 further comprising wirelessly pairing the KVD and DCD by:
(a) generating a weak shared secret key ("WS2K") on the KVD and DCD;
(b) mutually authenticating the KVD and DCD to each other using the WS2K;
(c) following mutual authentication, generating a strong secure session key ("S3K") on the KVD and DCD; and
(d) encrypting subsequent communications between the KVD and DCD using the S3K.

13. The method of claim 12 wherein the S3K expires and further comprising replacing the S3K that expires with a different S3K.

14. The method of claim 12 wherein an Out of Bounds or Passkey Entry Bluetooth™ Low Energy association model is used to generate the WS2K.

15. The method of claim 1 wherein a key vault system manager ("KVSM") is wirelessly communicative with at least one of the KVD and DCD, and further comprising:
(a) sending device health information from each of the at least one of the KVD and DCD to the KVSM;
(b) determining a health status of each of the at least one of the KVD and DCD based on the device health information; and
(c) deleting the EK and KEK based on the health status.

16. The method of claim 15 wherein each of the at least one of the KVD and DCD determines its own health status.

17. The method of claim 15 wherein the KVSM determines the health status of each of the at least one of the KVD and DCD and pushes the health status to each of the at least one of the KVD and DCD.

18. The method of claim 15 further comprising backing up the EK, KEK, and KEK_ID by pushing them from the DCD and KVD to the KVSM.

19. The method of claim 1 wherein the EK is encrypted using a public key having a linked private key, and further comprising recovering encrypted data following loss of one or both of the encrypted EK and KEK by:
(a) decrypting, using the private key, the EK encrypted using the public key;
(b) generating a new KEK, wherein the new KEK is not generated based on the user authentication secret;
(c) generating a new encrypted EK by encrypting the EK using the new KEK;
(d) storing the new encrypted EK on the DCD; and
(e) storing the new encrypted KEK on the KVD.

20. The method of claim 1 wherein the EK and KEK are generated pseudorandomly.

21. A method for decoupling user authentication and data encryption on mobile devices, the method comprising:
(a) decrypting an encrypted encryption key ("EK") stored on a data container device ("DCD") by:
(i) wirelessly retrieving to the DCD from a key vault device ("KVD") a key encryption key ("KEK") used to encrypt the EK; and
(ii) decrypting the encrypted EK using the KEK; and
(b) encrypting or decrypting data stored on the DCD using the EK, wherein neither the EK nor the KEK are generated using a user authentication secret as a seed;
(c) generating a KEK identifier ("KEK_ID") that identifies the KEK; and
(d) storing the KEK_ID in memory accessible to an application resident on the DCD that accesses the data and on the KVD.

22. The method of claim 21 further comprising deleting the EK from the DCD following encrypting or decrypting data.

23. The method of claim 21 further comprising, prior to decrypting the encrypted EK:
(a) generating the EK and the KEK;
(b) obtaining the encrypted EK by encrypting the EK using the KEK;
(c) storing the encrypted EK on the DCD; and
(d) storing the KEK on the KVD.

24. The method of claim 23 wherein the DCD generates the KEK, the EK, and the KEK_ID, and further comprising deleting the KEK from the DCD following encrypting EK.

25. The method of claim 23 wherein wirelessly retrieving the KEK from the KVD comprises:
(a) sending a request for the KEK_ID from the DCD to the KVD, wherein the request comprises the KEK_ID; and
(b) sending the KEK that the KEK_ID identifies from the KVD to the DCD.

26. The method of claim 21 further comprising safeguarding the data by deleting one or both of the EK and KEK.

27. The method of claim 21 wherein the DCD comprises a memory stick.

28. The method of claim 21 wherein the EK and KEK expire and further comprising replacing the EK and KEK that expire with a different EK and a different KEK, respectively.

29. The method of claim 21 wherein Bluetooth™ Low Energy protocol is used to link the KVD and DCD.

30. The method of claim 21 further comprising:
(a) determining whether the KVD and DCD cease to be wirelessly linked; and (b) deleting the EK from the DCD when the KVD and DCD cease to be wirelessly linked.

31. The method of claim 21 further comprising wirelessly pairing the KVD and DCD by:
   (a) generating a weak shared secret key ("WS2K") on the KVD and DCD;
   (b) mutually authenticating the KVD and DCD to each other using the WS2K;
   (c) following mutual authentication, generating a strong secure session key ("S3K") on the KVD and DCD; and
   (d) encrypting subsequent communications between the KVD and DCD using the S3K.

32. The method of claim 31 wherein the S3K expires and further comprising replacing the S3K that expires with a different S3K.

33. The method of claim 31 wherein an Out of Bounds or Passkey Entry Bluetooth™ Low Energy association model is used to generate the WS2K.

34. The method of claim 21 wherein a key vault system manager ("KVSM") is wirelessly communicative with at least one of the KVD and DCD, and further comprising:
   (a) sending device health information from each of the at least one of the KVD and DCD to the KVSM;
   (b) determining a health status of each of the at least one of the KVD and DCD based on the device health information; and
   (c) deleting the EK and KEK based on the health status.

35. The method of claim 34 wherein each of the at least one of the KVD and DCD determines its own health status.

36. The method of claim 34 wherein KVSM determines the health status of each of the at least one of the KVD and DCD and pushes the health status to each of the at least one of the KVD and DCD.

37. The method of claim 34 further comprising backing up the EK, KEK, and KEK_ID by pushing them from the DCD and KVD to the KVSM.

38. The method of claim 21 wherein the EK is encrypted using a public key having a linked private key, and further comprising recovering encrypted data following loss of one or both of the encrypted EK and KEK by:
   (a) decrypting, using the private key, the EK encrypted using the public key;
   (b) generating a new KEK, wherein the new KEK is not generated based on the user authentication secret;
   (c) generating a new encrypted EK by encrypting the EK using the new KEK;
   (d) storing the new encrypted EK on the DCD; and
   (e) storing the new encrypted KEK on the KVD.

39. The method of claim 21 wherein the EK and KEK are generated pseudorandomly.

40. A system for decoupling user authentication and data encryption on mobile devices, the system comprising:
   (a) a data container device ("DCD") wirelessly linked to a key vault device ("KVD"), the DCD comprising a DCD memory and a DCD controller communicative with the DCD memory, the DCD memory having encoded thereon statements and instructions cause the DCD controller to:
      (i) generate an encryption key ("EK") for encrypting data and a key encryption key ("KEK") for encrypting the EK, wherein neither the EK nor the KEK are generated using a user authentication secret as a seed;
      (ii) obtain an encrypted EK by encrypting the EK using KEK;
      (iii) store the encrypted EK in the DCD memory;
      (iv) send the KEK to the KVD;
      (v) generate a KEK identifier ("KEK_ID") that identifies the KEK; and
      (vi) store the KEK_ID in the DCD memory, wherein the DCD memory is accessible to an application resident on the DCD that accesses the data; and
   (b) the KVD comprising a KVD memory and a KVD controller communicative with the KVD memory, the KVD memory having encoded thereon statements and instructions to cause the KVD controller to:
      (i) receive the KEK from the DCD; and
      (ii) store the KEK in the KVD memory.

41. The system of claim 40 wherein the DCD memory is further encoded to cause the DCD controller to generate the KEK, the EK, and the KEK_ID, and to delete the KEK from the DCD following encrypting the EK.

42. The system of claim 40 wherein the DCD memory is further encoded to cause the application to encrypt or decrypt the data by:
   (a) obtaining the EK;
   (b) encrypting or decrypting the data using the EK; and
   (c) deleting the EK following encryption or decryption.

43. The system of claim 42 wherein obtaining the EK comprises:
   (a) sending a request from the application for the EK, wherein the request comprises the KEK_ID;
   (b) retrieving, from the KVD, the KEK that the KEK_ID identifies;
   (c) decrypting, on the DCD, the EK encrypted using the KEK retrieved from the KVD; and
   (d) sending the EK decrypted using the KEK to the application.

44. The system of claim 42 wherein obtaining the EK comprises:
   (a) sending a request from the application for the EK, wherein the request comprises the KEK_ID;
   (b) determining whether the EK is cached on the DCD; and
   (c) when the EK is cached on the DCD, sending the EK that is cached on the DCD to the application.

45. The system of claim 40 wherein the DCD memory is further encoded to cause the DCD controller to safeguard the data by deleting one or both of the EK and KEK.

46. The system of claim 40 wherein the DCD comprises a memory stick.

47. The system of claim 40 wherein the DCD memory is further encoded to cause the EK and KEK to expire and to cause the DCD controller to replace the EK and KEK that expire with a different EK and a different KEK, respectively.

48. The system of claim 40 wherein the Bluetooth™ Low Energy protocol is used to link the KVD and DCD.

49. The system of claim 40 wherein the DCD memory is further configured to cause the DCD controller to:
   (a) determine whether the KVD and DCD cease to be wirelessly linked; and
   (b) delete the EK from the DCD when the KVD and DCD cease to be wirelessly linked.

50. The system of claim 40 wherein the DCD memory and KVD memory are further encoded to cause the DCD and KVD, respectively, to wirelessly pair with each other by:
   (a) generating a weak shared secret key ("WS2K") on the KVD and DCD;
   (b) mutually authenticating the KVD and DCD to each other using the WS2K;
   (c) following mutual authentication, generating a strong secure session key ("S3K") on the KVD and DCD; and
   (d) encrypting subsequent communications between the KVD and DCD using the S3K.

51. The system of claim 50 wherein the S3K expires and wherein the DCD memory and the KVD memory are further encoded to cause the DCD and KVD, respectively, to replace the S3K that expires with a different S3K.

52. The system of claim 50 wherein an Out of Bounds or Passkey Entry Bluetooth™ Low Energy association model is used to generate the WS2K.

53. The system of claim 40 further comprising:
(a) a key vault system manager ("KVSM") wirelessly communicative with the KVD and DCD, the KVSM comprising a KVSM memory communicative with a KVSM controller, the KVSM memory having encoded thereon statements and instructions to cause the KVSM controller to receive device health information from the KVD and DCD,
wherein the DCD memory and the KVD memory are further encoded to cause the DCD controller and the KVD controller, respectively, to send device health information to the KVSM.

54. The system of claim 53 wherein the DCD memory and the KVD memory are further encoded to cause the DCD controller and the KVD controller, respectively, to:
(a) determine the health status of the DCD and the KVD, respectively, from the device health information; and
(b) delete the EK and KEK based on the health status.

55. The system of claim 53 wherein the KVSM memory is further encoded to cause the KVSM controller to:
(a) determine health statuses of the KVD and DCD from the device health information; and
(b) push the health statuses to the KVD and DCD,
wherein the DCD memory and the KVD memory are further encoded to cause the DCD controller and the KVD controller, respectively, to delete the EK and KEK based on one or more of the health status.

56. The system claim 53 wherein the DCD memory and the KVD memory are further encoded to back up the EK, KEK, and KEK_ID by pushing them to the KVSM.

57. The system of claim 40 wherein the DCD memory has stored thereon the EK encrypted using a public key having a linked private key, and wherein the DCD memory is further encoded to cause the DCD controller to:
(a) decrypt, using the private key, the EK encrypted using the public key;
(b) generate a new KEK, wherein the new KEK is not generated based on the user authentication secret;
(c) generate a new encrypted EK by encrypting the EK using the new KEK;
(d) store the new encrypted EK in the DCD memory; and
(e) send the new encrypted KEK to the KVD for storage.

58. The system of claim 40 wherein the EK and KEK are generated pseudorandomly.

59. A system for decoupling user authentication and data encryption on mobile devices, the system comprising a data container device ("DCD") wirelessly linked to a key vault device ("KVD"), the DCD comprising a DCD memory and a DCD controller communicative with the DCD memory and the KVD comprising a KVD memory and a KVD controller communicative with the KVD memory, the DCD memory having encoded thereon statements and instructions to cause the DCD controller to:
(a) decrypt an encrypted encryption key ("EK") stored in the DCD memory by:
(i) wirelessly retrieving from the KVD a key encryption key ("KEK") used to encrypt the EK; and
(ii) decrypting the encrypted EK using the KEK;
(b) encrypt or decrypt data stored in the DCD memory using the EK, wherein neither the EK nor the KEK are generated using a user authentication secret as a seed;
(c) generate a KEK identifier ("KEK_ID") that identifies the KEK; and
(d) store the KEK_ID in the DCD memory, wherein the DCD memory is accessible to an application resident on the DCD that accesses the data.

60. The system of claim 59 wherein the DCD memory is further encoded to cause DCD controller to delete the EK following encrypting or decrypting data.

61. The system of claim 59 wherein the DCD memory is further encoded to cause the DCD controller to:
(a) generate the EK and the KEK;
(b) obtain the encrypted EK by encrypting the EK using the KEK;
(c) store the encrypted EK in the DCD memory; and
(d) send the KEK to the KVD.

62. The system of claim 61 wherein the DCD memory is further encoded to cause the DCD controller to generate the KEK, the EK, and the KEK_ID, and to delete the KEK from the DCD following encrypting the EK.

63. The system of claim 61 wherein wirelessly retrieving the KEK from the KVD comprises:
(a) sending a request for the KEK_ID from the DCD to the KVD, wherein the request comprises the KEK_ID; and
(b) sending the KEK that the KEK_ID identifies from the KVD to the DCD.

64. The system of claim 59 wherein the DCD memory is further encoded to cause the DCD controller to safeguard the data by deleting one or both of the EK and KEK.

65. The system of claim 59 wherein the DCD comprises a memory stick.

66. The system of claim 59 wherein the DCD memory is further encoded to cause the EK and KEK to expire and to cause the DCD controller to replace the EK and KEK that expire with a different EK and a different KEK, respectively.

67. The system of claim 59 wherein the Bluetooth™ Low Energy protocol is used to link the KVD and DCD.

68. The system of claim 59 wherein the DCD memory is further configured to cause the DCD controller to:
(a) determine whether the KVD and DCD cease to be wirelessly linked; and
(b) delete the EK from the DCD when the KVD and DCD cease to be wirelessly linked.

69. The system of claim 59 wherein the DCD memory and KVD memory are further encoded to cause the DCD and KVD, respectively, to wirelessly pair with each other by:
(a) generating a weak shared secret key ("WS2K") on the KVD and DCD;
(b) mutually authenticating the KVD and DCD to each other using the WS2K;
(c) following mutual authentication, generating a strong secure session key ("S3K") on the KVD and DCD; and
(d) encrypting subsequent communications between the KVD and DCD using the S3K.

70. The system of claim 69 wherein the S3K expires and wherein the DCD memory and the KVD memory are further encoded to cause the DCD and KVD, respectively, to replace the S3K that expires with a different S3K.

71. The system of claim 69 wherein an Out of Bounds or Passkey Entry Bluetooth™ Low Energy association model is used to generate the WS2K.

72. The system of claim 59 further comprising:
(a) a key vault system manager ("KVSM") wirelessly communicative with the KVD and DCD, the KVSM comprising a KVSM memory communicative with a KVSM controller, the KVSM memory having encoded thereon statements and instructions to cause the KVSM controller to receive device health information from the KVD and DCD, wherein the DCD memory and the KVD memory are further encoded to cause the DCD controller and the KVD controller, respectively, to send device health information to the KVSM.

73. The system of claim 72 wherein the DCD memory and the KVD memory are further encoded to cause the DCD controller and the KVD controller, respectively, to:
   (a) determine the health status of the DCD and the KVD, respectively, from the device health information; and
   (b) delete the EK and KEK based on the health status.

74. The system of claim 72 wherein the KVSM controller is further encoded to cause the KVSM controller to:
   (a) determine health statuses of the KVD and DCD from the device health information; and
   (b) push the health statuses to the KVD and DCD,
   wherein the DCD memory and the KVD memory are further encoded to cause the DCD controller and the KVD controller, respectively, to delete the EK and KEK based on one or more of the health status.

75. The system of claim 72 wherein the DCD memory and the KVD memory are further encoded to back up the EK, KEK, and KEK_ID by pushing them to the KVSM.

76. The system of claim 59 wherein the DCD memory has stored thereon the EK encrypted using a public key having a linked private key, and wherein the DCD memory is further encoded to cause the DCD controller to:
   (a) decrypt, using the private key, the EK encrypted using the public key;
   (b) generate a new KEK, wherein the new KEK is not generated based on the user authentication secret;
   (c) generate a new encrypted EK by encrypting the EK using the new KEK;
   (d) store the new encrypted EK in the DCD memory; and
   (e) send the new encrypted KEK to the KVD for storage.

77. The system of claim 59 wherein the EK and KEK are generated pseudorandomly.

78. A non-transitory computer readable medium having encoded thereon statements and instructions to cause a controller to:
   (a) generate an encryption key ("EK") for encrypting data and a key encryption key ("KEK") for encrypting the EK, wherein neither the EK nor the KEK are generated using a user authentication secret as a seed;
   (b) obtain an encrypted EK by encrypting the EK using the KEK;
   (c) store the encrypted EK on a data container device ("DCD");
   (d) store the KEK on a key vault device ("KVD") that is distinct from the DCD;
   (e) generating a KEK identifier ("KEK_ID") that identifies the KEK; and
   (f) storing the KEK_ID in memory accessible to an application resident on the DCD that accesses the data and on the KVD.

79. A non-transitory computer readable medium having encoded thereon statements and instructions to cause a controller to:
   (a) decrypt an encrypted encryption key ("EK") stored on a data container device ("DCD") by:
      (i) wirelessly retrieving to the DCD from a key vault device ("KVD") a key encryption key ("KEK") used to encrypt the EK; and
      (ii) decrypting the encrypted EK using the KEK;
   (b) encrypt or decrypt data stored on the DCD using the EK, wherein neither the EK nor the KEK are generated using a user authentication secret as a seed;
   (c) generating a KEK identifier ("KEK_ID") that identifies the KEK; and
   (d) storing the KEK_ID in memory accessible to an application resident on the DCD that accesses the data and on the KVD.

* * * * *

UNITED STATES PATENT AND TRADEMARK OFFICE
CERTIFICATE OF CORRECTION

PATENT NO. : 9,137,659 B2
APPLICATION NO. : 13/943070
DATED : September 15, 2015
INVENTOR(S) : Hassan Khosravi, Ildar Muslukhov and Peter Luong It is certified that error appears in the above-identified patent and that said Letters Patent is hereby corrected as shown below:

In the Claims

Column 32, claim 1, line 62, delete "KEK ID" and insert in its place --KED_ID--.

Signed and Sealed this
Twenty-second Day of March, 2016

Michelle K. Lee
*Director of the United States Patent and Trademark Office*